US012760677B2

(12) United States Patent
Hill et al.

(10) Patent No.: US 12,760,677 B2
(45) Date of Patent: Oct. 13, 2026

(54) METHOD FOR JOINING COMPONENTS OF AN EXHAUST SYSTEM

(71) Applicant: Tenneco Automotive Operating Company LLC, Northville, MI (US)

(72) Inventors: Edward C. Hill, Jackson, MI (US); Matthew Yule, Howell, MI (US); Dongying Jiang, Ann Arbor, MI (US)

(73) Assignee: Tenneco Automotive Operating Company LLC, Northville, MI (US)

( * ) Notice: Subject to any disclaimer, the term of this patent is extended or adjusted under 35 U.S.C. 154(b) by 0 days.

(21) Appl. No.: 18/748,878

(22) Filed: Jun. 20, 2024

(65) Prior Publication Data

US 2024/0337210 A1 Oct. 10, 2024

Related U.S. Application Data

(63) Continuation-in-part of application No. PCT/US2023/084850, filed on Dec. 19, 2023.

(Continued)

(51) Int. Cl.

*F01N 13/18* (2010.01)
*B21D 39/04* (2006.01)
*F16L 13/14* (2006.01)

(52) U.S. Cl.

CPC ....... *F01N 13/1805* (2013.01); *B21D 39/046* (2013.01); *B21D 39/048* (2013.01);

(Continued)

(58) Field of Classification Search

CPC ... B23P 11/005; B21D 39/048; B21D 39/046; F16L 13/141; F16L 13/14

See application file for complete search history.

(56) References Cited

U.S. PATENT DOCUMENTS 3,068,563 A 12/1962 Reverman
3,071,993 A 1/1963 Alfred et al.

(Continued)

FOREIGN PATENT DOCUMENTS

CH 648643 A5 3/1985
CN 112728233 A 4/2021

(Continued)

OTHER PUBLICATIONS

English Machine Translation of No. 126814-B (Year: 1973).*
International Search Report and Written Opinion of the ISA issued in PCT/US2023/084850, mailed Mar. 25, 2024; ISA/US.

*Primary Examiner* — Sarang Afzali
(74) *Attorney, Agent, or Firm* — Harness, Dickey & Pierce, P.L.C.

(57) ABSTRACT

An exhaust system and a method of joining components of an exhaust system comprises obtaining an outer sleeve, a first pipe with a first end, and a second pipe with a second end. The method includes inserting the first end of the first pipe within the outer sleeve to define a first overlap, inserting the second end of the second pipe within the outer sleeve to define a second overlap, and radially inwardly deforming the outer sleeve and the first pipe at the first overlap. The outer sleeve and the second pipe are radially inwardly deformed at the second overlap. The outer sleeve and the first pipe as well as the outer sleeve and the second pipe are pressed into engagement with one another along the length of first overlap and the second overlap to define a pipe joint.

10 Claims, 22 Drawing Sheets

Related U.S. Application Data

(60) Provisional application No. 63/434,495, filed on Dec. 22, 2022.

(52) U.S. Cl.
CPC .......... *F01N 13/185* (2013.01); *F16L 13/141* (2013.01); *F01N 2450/20* (2013.01); *F01N 2470/24* (2013.01)

(56) References Cited

U.S. PATENT DOCUMENTS

| | | | | | |
|---|---|---|---|---|---|
| 3,087,747 | A * | 4/1963 | Novotny | F16L 31/00 | 285/260 |
| 3,827,727 | A * | 8/1974 | Moebius | F16L 13/146 | 29/520 |
| 4,624,489 | A * | 11/1986 | Nakamura | B21D 39/04 | 285/55 |
| 5,007,667 | A | 4/1991 | Unewisse et al. | | |
| 5,405,176 | A * | 4/1995 | Babel | B21D 39/04 | 29/520 |
| 5,484,174 | A | 1/1996 | Gotoh et al. | | |
| 5,730,472 | A * | 3/1998 | Krause | F16L 47/00 | 285/21.2 |
| 5,890,287 | A | 4/1999 | Fukaya | | |
| 6,474,701 | B1 * | 11/2002 | Bowles | F16L 13/141 | 285/256 |
| 6,543,577 | B1 | 4/2003 | Ferreira et al. | | |
| 6,688,653 | B1 * | 2/2004 | Thrift | F16L 13/143 | 285/148.13 |
| 7,637,539 | B2 * | 12/2009 | McKee | E21B 17/20 | 166/242.6 |
| 8,870,236 | B2 | 10/2014 | Rule et al. | | |
| 9,145,992 | B2 | 9/2015 | Arment et al. | | |
| 9,752,708 | B2 | 9/2017 | Blueml | | |
| 9,869,417 | B2 | 1/2018 | Kajino et al. | | |
| 2006/0103135 | A1 | 5/2006 | Scott | | |
| 2008/0164692 | A1 | 7/2008 | Goggin | | |
| 2011/0215573 | A1 | 9/2011 | Tanaka et al. | | |
| 2014/0252762 | A1 | 9/2014 | Salazar | | |
| 2015/0300540 | A1 * | 10/2015 | Hofmann | B25B 27/10 | 29/516 |
| 2018/0291794 | A1 | 10/2018 | Hill et al. | | |

FOREIGN PATENT DOCUMENTS

| | | | | | |
|---|---|---|---|---|---|
| CN | 213510826 | U | | 6/2021 | |
| DE | 29813935 | U1 | | 10/1998 | |
| DE | 19820314 | A1 | | 11/1999 | |
| DE | 20005575 | U1 | | 9/2000 | |
| DE | 102020115859 | A1 | | 12/2021 | |
| EP | 0683345 | A2 | | 11/1995 | |
| EP | 1405000 | A1 | | 4/2004 | |
| NO | 126814 | B | * | 3/1973 | B21D 39/04 |
| WO | 03004917 | A1 | | 1/2003 | |

* cited by examiner

METHOD FOR JOINING COMPONENTS OF AN EXHAUST SYSTEM

FIELD

The present disclosure generally relates to an exhaust system for a vehicle equipped with an internal combustion engine. More particularly, a non-welded mechanical joint between exhaust components is described.

BACKGROUND

Exhaust systems for vehicles equipped with internal combustion engines typically include several individual exhaust pipes that are interconnected to one another with welds or clamps. Multiple portions of exhaust pipe must be used in lieu of one very long pipe due to the packaging constraints within the vehicle. Portions of the exhaust pipe must pass by, around or through various underbody structures of the vehicle.

To account for the multi-piece exhaust system, Original Equipment Manufacturers typically install welding stations or utilize clamps and mechanical fastener tightening equipment on the vehicle assembly line. The complexities associated with welding and the resultant weld splatter are typically undesirable. Furthermore, a minimum exhaust pipe exhaust wall thickness is required to weld the pipe portions to one another. The use of pipes having very thin wall thickness has been contemplated to minimize the weight of the exhaust system. Welding thin wall pipes is challenging based on the limited quantity of material available within the melt pool. Using welding as the interconnection process sometimes creates a suitable mechanical joint but often the joint may not meet leakage specifications. Unfortunately, costly and time-consuming repair procedures may be required to sufficiently seal welded pipe joints.

The use of clamps is costly and requires shipping, handling and purchasing efforts. The components of a given clamp must be properly aligned with the exhaust portions to be coupled to one another during the vehicle assembly process and installed. Typically, clamps are equipped with mechanical fasters to perform a tightening or clamping operation. The assembly line must facilitate the clamping process by providing sufficient tooling and access to clamps.

As such, it may be desirable to provide an alternate mechanical joint and mechanical joining process between exhaust pipes eliminating the need for welds and welding equipment or clamps and clamping equipment.

SUMMARY

An exhaust system and a method of joining components of an exhaust system comprises obtaining an outer sleeve, a first pipe with a first end, and a second pipe with a second end. The method includes inserting the first end of the first pipe within the outer sleeve to define a first overlap, inserting the second end of the second pipe within the outer sleeve to define a second overlap, and radially inwardly deforming the outer sleeve and the first pipe at the first overlap. The outer sleeve and the second pipe are radially inwardly deformed at the second overlap. The outer sleeve and the first pipe as well as the outer sleeve and the second pipe are pressed into engagement with one another along the length of first overlap and the second overlap to define a pipe joint.

Another method of joining components of an exhaust system comprises obtaining a first pipe with a first end and inserting a second end of a second pipe within the first end of the first pipe to provide a length of overlapped first and second pipes. The method also includes radially inwardly deforming the overlapped first and second pipes into pressed engagement with one another to define a pipe joint.

An exhaust system according to the present disclosure comprises a first pipe having a first end and a second pipe having a second end positioned within the first end to provide a length of overlapped first and second pipes. Both of the first end and the second end are radially inwardly deformed into pressed engagement with one another. The first and second pipes are engaged with one another at the radial deformation forming a seal.

In another arrangement, a method of joining components of an exhaust system includes inserting a second end of a second pipe within a first end of a first pipe to provide a length of overlapped first and second pipes. This method includes circumscribing an outer surface of the first pipe at the overlap with a tool including radially moveable jaws. At least one of the jaws includes a radially inwardly extending projection protruding from a working surface of the jaw. The method further includes radially inwardly moving the jaws toward the outer surface until the projection contacts the outer surface before the working surface of the jaw contacts the outer surface. The method continues by continuing to radially inwardly move the jaws to reduce an outer diameter of the first pipe, reduce an outer of the diameter of the second pipe, and deform the overlapped first and second pipes into pressed engagement with one another while simultaneously driving the projection into the outer surface of the pipe to form a dimple mechanically locking the first pipe with the second pipe.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
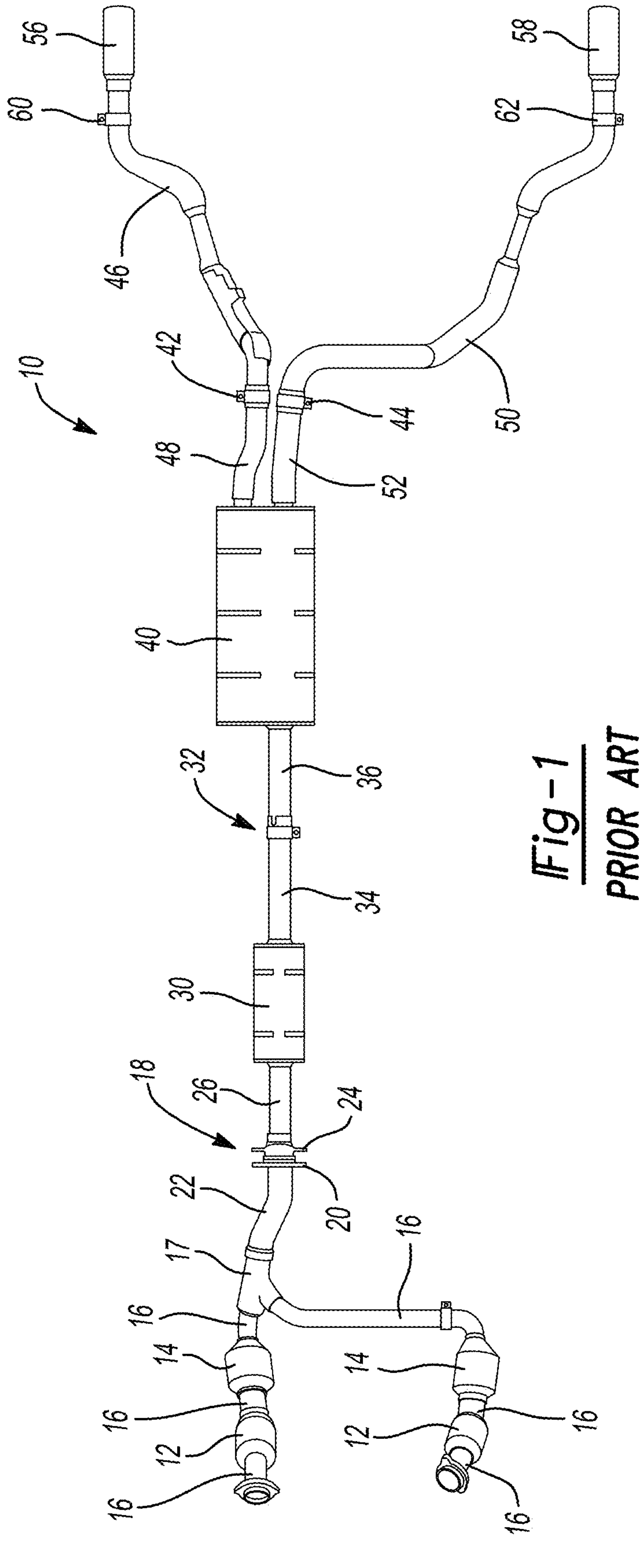
Fig-1 PRIOR ART
FIG. 1 is a schematic of an exemplary exhaust system equipped with a plurality of pipes and pipe joints.

The present disclosure generally relates to an exhaust system for a vehicle equipped with an internal combustion engine. A non-welded mechanical joint is formed between exhaust pipes.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms.

These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An exemplary exhaust system 10 for a vehicle (not shown) includes several exhaust devices, several segments of exhaust pipe, various interconnectors between the pipe segments including V-band clamps, flange clamps, junctions, and weldments. FIG. 1 is provided for illustrative purposes only with examples of a number of interconnections between exhaust pipes and exhaust components that are present in an exhaust system. Exhaust system 10 includes one or more catalytic converters 12 in receipt of exhaust gas omitted from an internal combustion engine (note shown). Another exhaust device 14 such as a filter or another catalytic converter is positioned downstream from each catalytic converter 12 in series. Exhaust pipes 16 are present at the inlet to catalytic converters 12 and interconnect the outlets from catalytic converters 12 to inlets of devices 14. Mechanical interconnection exists at each of these interfaces to sealingly connect the exhaust pipe to the exhaust device.

Exhaust system 10 also includes a junction 17 interconnecting two exhaust pipes 16 at a singular location to form a singular exhaust flow path. A service joint 18 includes a first flange 20 fixed to an exemplary exhaust pipe 22 and a second flange 24 fixed to another exhaust pipe 26. Flange 20 and flange 24 are removably fixed to one another to allow service to the exhaust system 10. A silencer 30 is positioned further downstream and in receipt of exhaust passing through exhaust pipe 26. A welded joint exists at the junction between exhaust pipe 26 and silencer 30.

A clamp 32 interconnects exhaust pipes 34 and 36 to provide another service joint. Exhaust pipe 34 is welded to an outlet of silencer 30. Exhaust pipe 36 is welded or otherwise fixed to an inlet of a muffler 40. Additional clamps 42, 44 are provided to create additional service joints allowing disconnection and reconnection of a first tail pipe 46 from an exhaust pipe 48 as well as disconnection between a second tail pipe 50 from an exhaust pipe 52. Tail pipe tips 56, 58 are fixed to first tail pipe 46 and second tail pipe 50, respectively via additional clamps 60, 62. Tail pipe tips 56, 58 are welded to relatively short exhaust pipes 64, 66, respectively that are subsequently fixed to another portion via clamps 60, 62. It is envisioned that the clamp-less and non-welded joints described in this paper may replace any one or all of the previously described joints interconnecting an exhaust pipe with another exhaust pipe or a portion of an exhaust device.

An exemplary joint 70 constructed in accordance with the teachings of the present disclosure is depicted in FIGS. 2-5. Joint 70 includes a first pipe 72 is sealing fixed to a second pipe 74. First pipe 72, second pipe 74 and joint 70 extend along a longitudinal axis 73 and are adapted to transport exhaust emitted from the internal combustion engine (not shown) to atmosphere.

It is envisioned that joint 70 may be used to sealingly interconnect any number of components positioned downstream from the internal combustion engine including, but not limited to, pipes, exhaust manifolds, headers, catalytic converters, particle filters, heaters, y-pipes, resonators, mufflers, heaters, coolers, pumps and the like. It may be necessary to interconnect inlets or outlets of any one of these devices to a pipe or directly to one another. As such, the claimed pipes may be configured as stand-alone tubular components or may represent tubular portions of any device within exhaust system 10.

Figure 2:
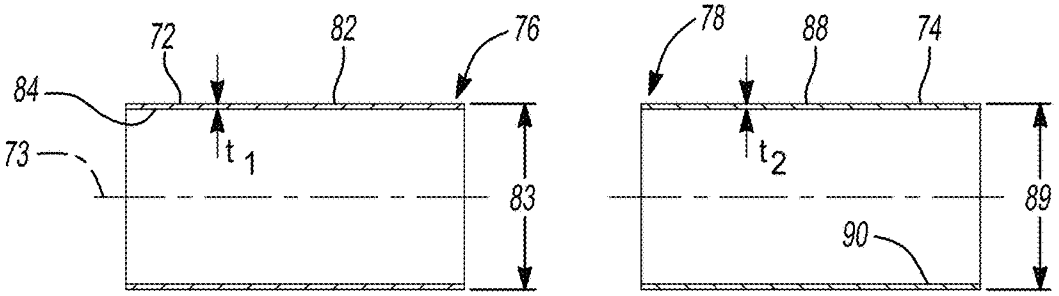
FIG. 2 is a cross-sectional view of a first pipe and a second pipe prior to mechanical interconnection.

First pipe 72 includes a first end 76. Second pipe 74 includes a second end 78. Joint 70 is formed to sealingly interconnect first end 76 of first pipe 72 with second end 78 of second pipe 74. In the example depicted, first pipe 72 includes an outer surface 82 defining an outer diameter 83 and an inner surface 84 defining an inner diameter of first pipe 72. First pipe 72 has a substantially constant wall thickness $t_1$. Similarly, second pipe 74 includes an outer surface 88 having an outer diameter 89 as well as an inner surface 90 defining an inner diameter of second pipe 74. Second pipe 74 includes a substantially constant wall thickness $t_2$. In the embodiment depicted in FIG. 2, the initial inner diameter, outer diameter, and thickness of first pipe 72 are substantially the same as the corresponding initial characteristics of second pipe 74. This initial arrangement is depicted in FIG. 2. It should be appreciated that the first and second pipes having the same dimensional characteristics is merely exemplary and that the present disclosure should not be limited in such a way. Pipes having different wall thicknesses or material types are contemplated as well as pipes having different initial outer diameters or inner diameters.

Figure 3:
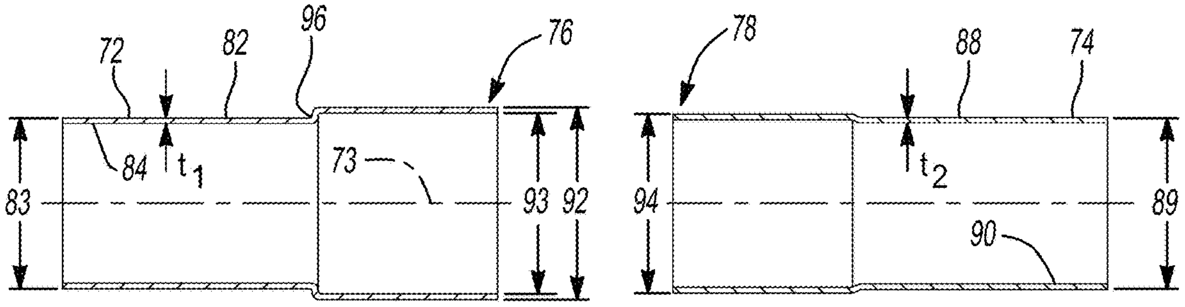
FIG. 3 is a cross-sectional view of a work-in-process step relating to interconnecting the first pipe and a second pipe depicted in FIG. 2.
Figure 6:
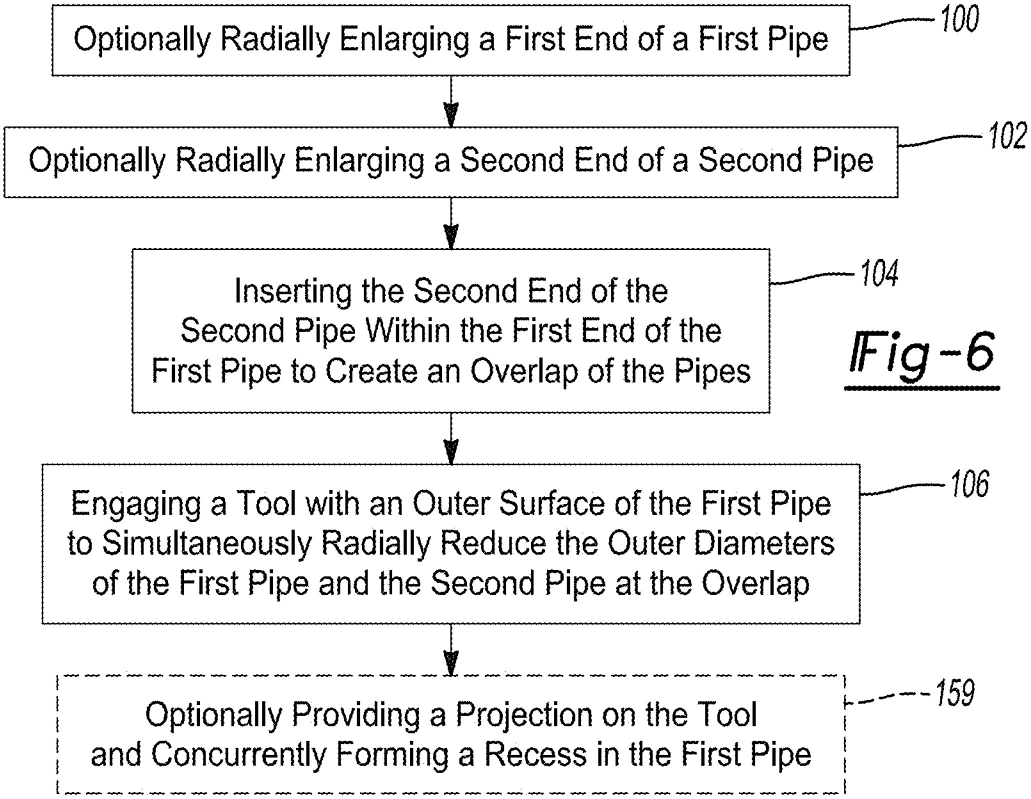
FIG. 6 is a flow chart describing a method of interconnecting pipes.

FIG. 3 visually depicts a first step in a mechanical joining process for creating joint 70 without welding. FIG. 6 provides a flow chart reciting the steps of a method of forming joint 70. The process includes enlarging the inner diameter and the outer diameter of first end 76 of first pipe 72 at step 100. The enlarged outer diameter of first pipe 72 is identified as diameter 92 and the enlarged inner diameter is noted at reference numeral 93. Optionally, the inner diameter and the outer diameter of second end 78 of second pipe 74 may be enlarged. An alternate method where the second end of the second pipe is not enlarged is described later in this document. If enlarged, the enlarged outer diameter of second pipe 74 is identified as diameter 94. In the example depicted in the figures, the inner diameter 93 of first pipe 72 at first end 76 is enlarged a sufficient amount to receive second end 78 of second pipe 74 in a slip fit arrangement after the enlargement of second end 78 of second pipe 74. To achieve this geometrical interrelationship, first end 76 of first pipe 72 is enlarged an amount to receive second pipe 74. Inner diameter 93 is greater than outer diameter 94. It should be appreciated that steps 100 and 102 may be alternatively accomplished by simply obtaining pipes of appropriate size to allow the pipes to overlap.

Figure 4:
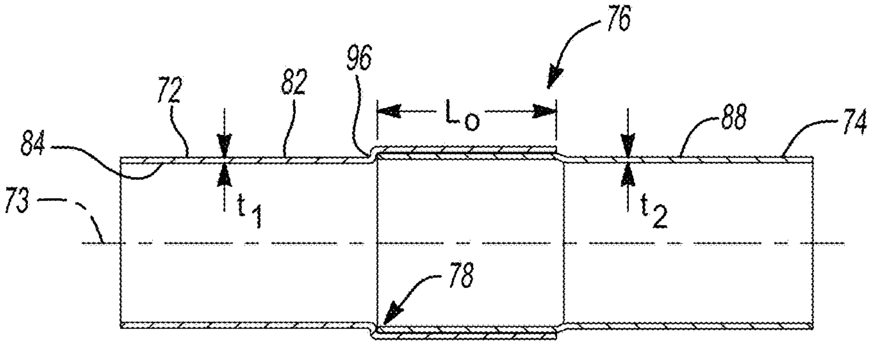
FIG. 4 is a cross-sectional view of a work-in-process step relating to interconnecting the first pipe and a second pipe depicted in FIG. 3.

As shown in FIGS. 4 and 6, step 104 of the mechanical joining process includes inserting enlarged second end 78 of second pipe 74 within enlarged first end 76 until second end 78 is restricted from further insertion at a transition zone 96. Transition zone 96 is the area at which the inner diameter and outer diameter of first pipe 72 changes from the initial size depicted in FIG. 2 to the enlarged size depicted in FIG. 3. After second pipe 74 is inserted within first pipe 72, an axial overlap of pipis exists. The overlap is identified in FIG. 4 as a distance $L_O$. At the overlap, it is contemplated that the clearance between inner surface 84 of first pipe 72 and outer surface 88 of second pipe 74 ranges from 0.002 inches to 0.120 inches.

Figure 5:
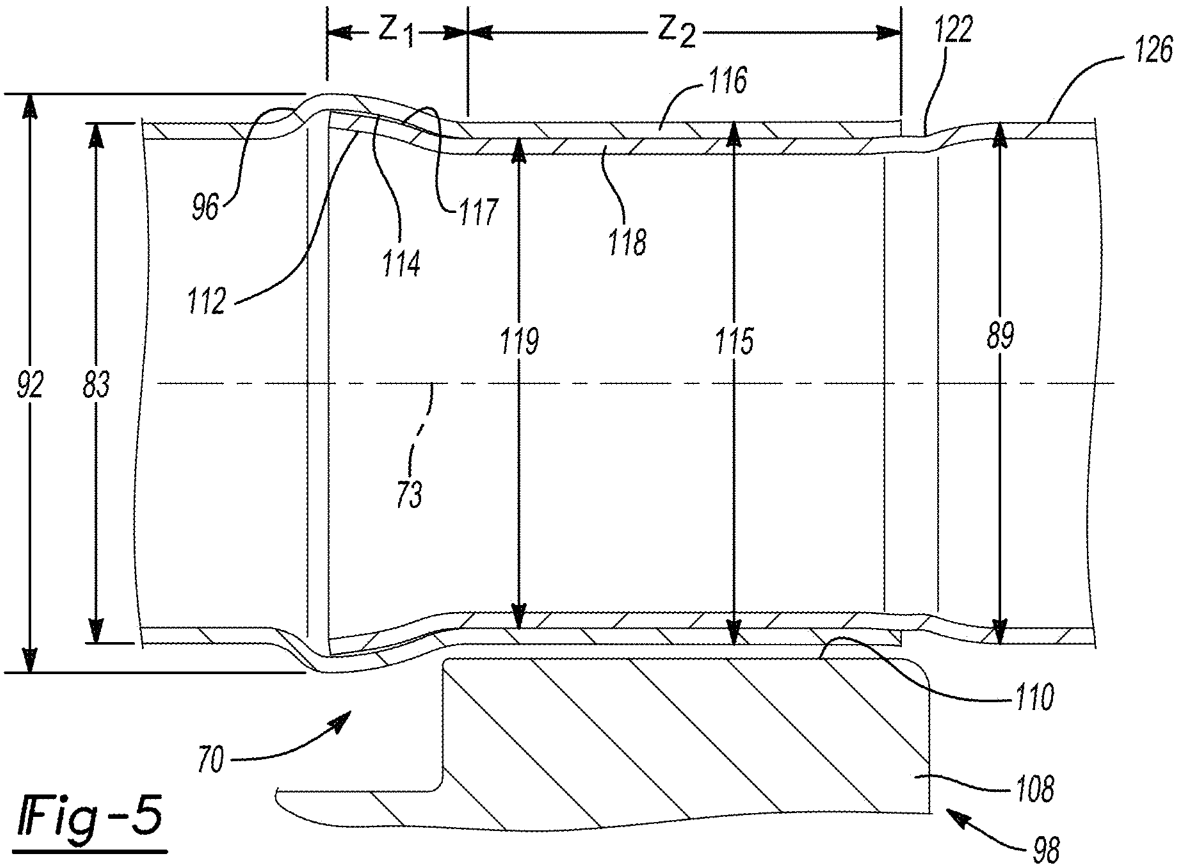
FIG. 5 is a cross-sectional view depicting deformed and interconnected first and second pipes according to a first embodiment of the present disclosure.

FIG. 5 depicts first pipe 72 sealingly fixed to second pipe 74 at joint 70. It should be appreciated that "sealingly fixed" does not intend to mean that no leakage occurs at joint 70. Some exhaust gas may flow through joint 70 and be acceptable. For instance, a leak rate of 8.0 slpm is generally accepted for many service joints positioned downstream of emissions treatment components. This magnitude of leak may be acceptable and considered a low-leak joint having pipes sealingly fixed to one another.

To obtain the configuration depicted in FIG. 5, a mechanical deformation tool 98 is positioned on the outside of first pipe 72 circumscribing outer surface 82 along a portion of the axial length of first pipe 72. No tooling is positioned within either of first pipe 72 or second pipe 74. Tool 98 is operable to radially inwardly displace not only a portion of first pipe 72 but also a portion of second pipe 74 about which the tool circumscribes. In one example, tool 98 may include a plurality of radially translatable jaws 108. Each jaw 108 includes a working surface 110 adapted to directly and drivingly engage outer surface 82. At step 106, tool 98 simultaneously radially reduces the outer diameter of both first pipe 72 and second pipe 74.

An axial extent of working surface 110 may be substantially equal to the overlap length $L_o$ or a distance less than $L_o$. FIG. 5 depicts a joint based on use of tool 98 having an axial extent of working surface 110 less than $L_o$. Accordingly, joint 70 includes different zones of relative interconnection and deformation along the longitudinal direction of axis 73. Zone 1, identified as $Z_1$ in the figures, includes a portion of joint 70 that is not engaged by tool 98. Accordingly, some of the outer surface 82 of first pipe exhibits substantially the same outer diameter 92 as it did prior to the radial downsizing step. The outer diameter tapers down within Zone 1 as the first pipe wall approaches Zone 2 to define a mechanical interlock formed to resist forces attempting to axially move first pipe 72 relative to second pipe 74 along longitudinal axis 73. More particularly, a terminal end portion 112 of second pipe 74 remains generally uncompressed from the radial inward movement of jaws 108 and maintains the enlarged outer diameter depicted in FIG. 3. After tool 98 mechanically joins pipes 72,74 to another, a first seat 114 is formed on inner surface 84 within Zone 1. First seat 114 is a generally conically shaped surface axially extending from transition zone 96 to a radially reduced portion 116 of first pipe 72. Radially reduced portion 116 is substantially cylindrically shaped. A corresponding second seat 117 is formed on outer surface 88 of second pipe 74 and axially extends from terminal end portion 112 to a radially inwardly deformed portion 118 of second pipe 74. First seat 114 and second seat 117 are engaged with one another to resist relative axial movement of first pipe 72 away from second pipe 74. Relative axial movement between first pipe 72 and second pipe 74 in the opposite direction is restricted by transition zone 96 and terminal end portion 112. Outer surface 88 of second pipe 74 may be slightly spaced apart from inner surface 84 of first pipe 72 at some locations within Zone 1. Such spaces may be present due to the relatively large change in pipe diameter required to meet axial force pullout targets. Due to the presence of these spaces, Zone 1 does not necessarily include pipe portions that are "sealing fixed" to one another. Zone 1 does not necessarily provide a joint that meets the leak rate target. As such, it may be beneficial to position Zone 1 as axially far away from the sealingly engaged pipe surfaces as possible.

At Zone 2 ($Z_2$), a portion of first pipe 72 that was previously radially outwardly expanded, as depicted in FIGS. 3 and 4, is radially inwardly deformed at radially reduced portion 116 to a reduced diameter 115 that may be the original diameter 83, or as shown in FIG. 5, even a lesser diameter than the original outside diameter 83 of first pipe 72. As the first pipe 72 is radially inwardly deformed at radially reduced portion 116, so is the portion of second end 78 that is within Zone 2 and identified as radially inwardly deformed portion 118. Second pipe 74 may be deformed inside of first pipe 72 to such an extent that an outer diameter 119 of second pipe 74 at radially inwardly deformed portion 118 is less than the original outer diameter 89 of second pipe 74. As such, a transition 122 may exist between reduced diameter portion 118 and an undeformed portion 126 of second pipe 74.

After creation of joint 70 as previously described, Zone 1 provides excellent resistance to relative axial movement between first pipe 72 and second pipe 74. Zone 2 provides an interface between first pipe 72 and second pipe 74 that meets the leak rate targets. Zone 2 includes an axial extent that may be characterized as having pipes that are sealingly engaged with one another to provide low-leak joint 70. The mechanical deformations previously described also provide resistance to relative torsional movement between the first pipe 72 and the second pipe 74.

In some applications, it may be desirable to provide even greater resistance to torsional loading to assure that a robust pipe joint is maintained for the life span of the exhaust system. FIG. 10 depicts an alternate embodiment joint 70' that includes a plurality of circumferentially spaced apart and radially inwardly extending dimples 150. FIGS. 7-10C depict a process of manufacturing joint 70'. It should be appreciated that joint 70' is substantially similar to joint 70 with the addition of dimples 150. Accordingly, like elements will retain their previously introduced reference numerals including a prime suffix.

Figure 7:
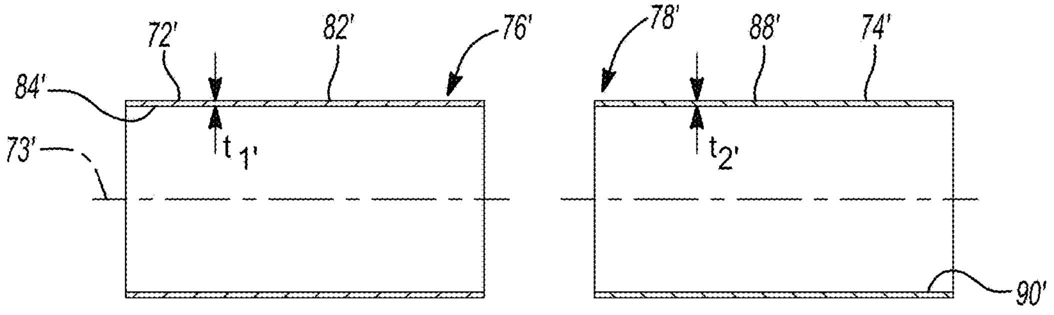
FIG. 7 is a cross-sectional view of a first pipe and a second pipe prior to mechanical interconnection.
Figure 8:
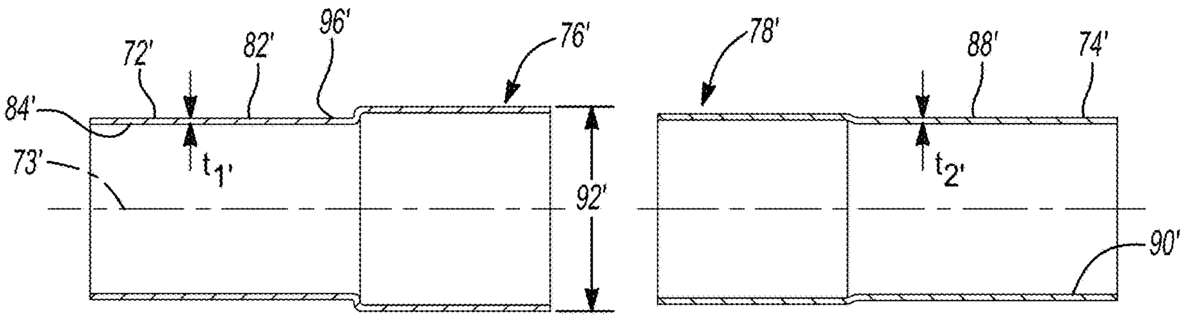
FIG. 8 is a cross-sectional view of a work-in-process step relating to interconnecting the first pipe and a second pipe depicted in FIG. 7.
Figure 9:
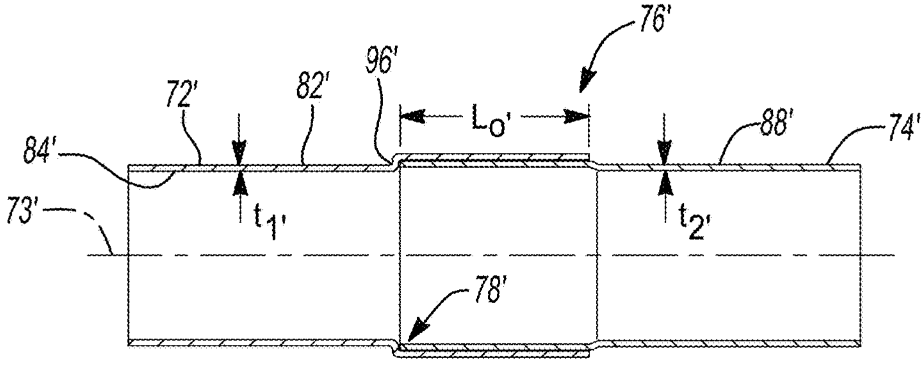
FIG. 9 is a cross-sectional view of a work-in-process step relating to interconnecting the first pipe and a second pipe depicted in FIG. 8.
Figures 10A, 10B, 10C:
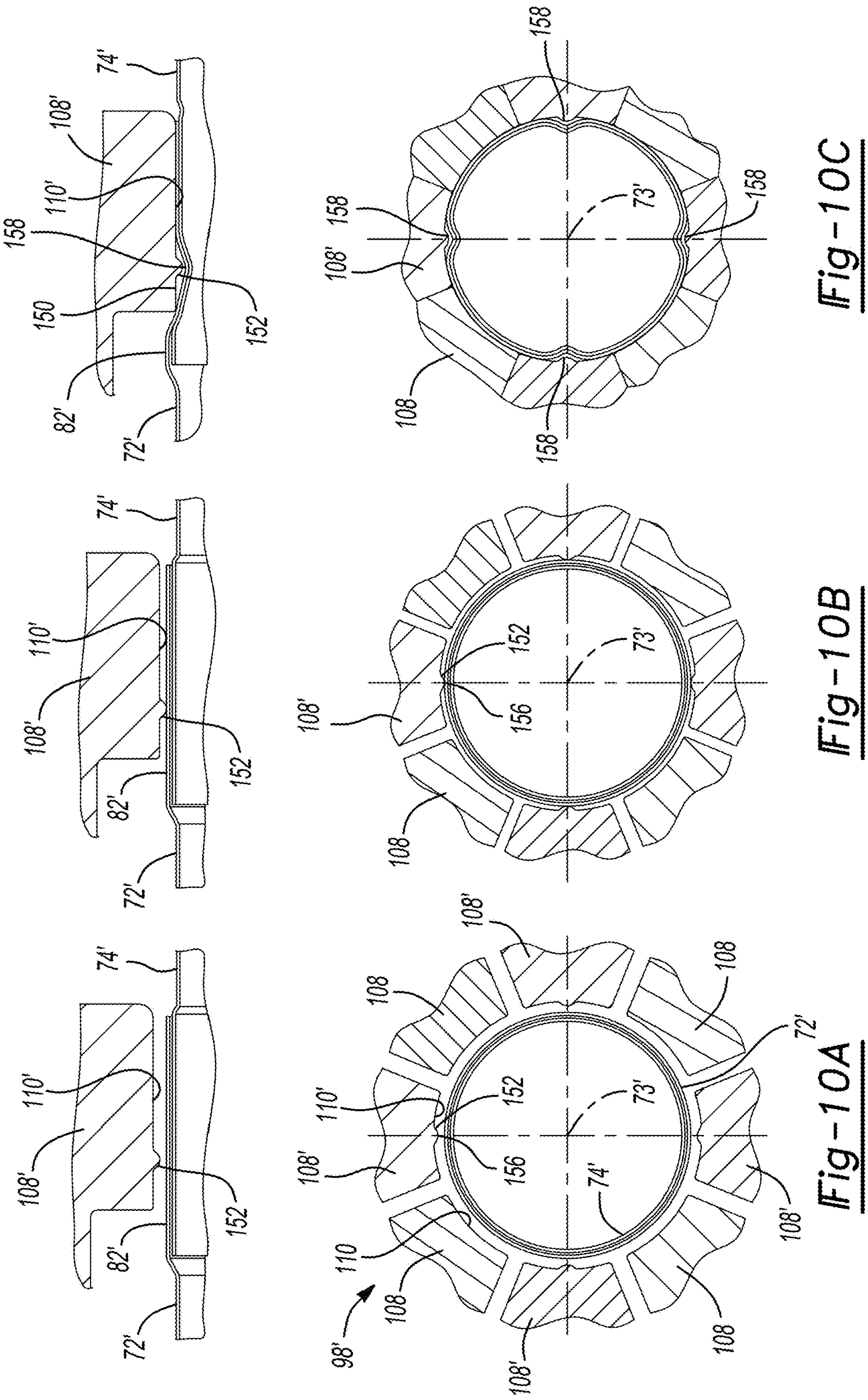
FIGS. 10A, 10B, and 10C depict additional process steps for forming a pipe joint.

FIGS. 7-9 are provided for completeness as they depict the initial steps for creating joint 70'. For the sake of brevity, however, these process steps are the same as those previously described at steps 100, 102, and 104 and will not be described again in detail.

Figure 11:
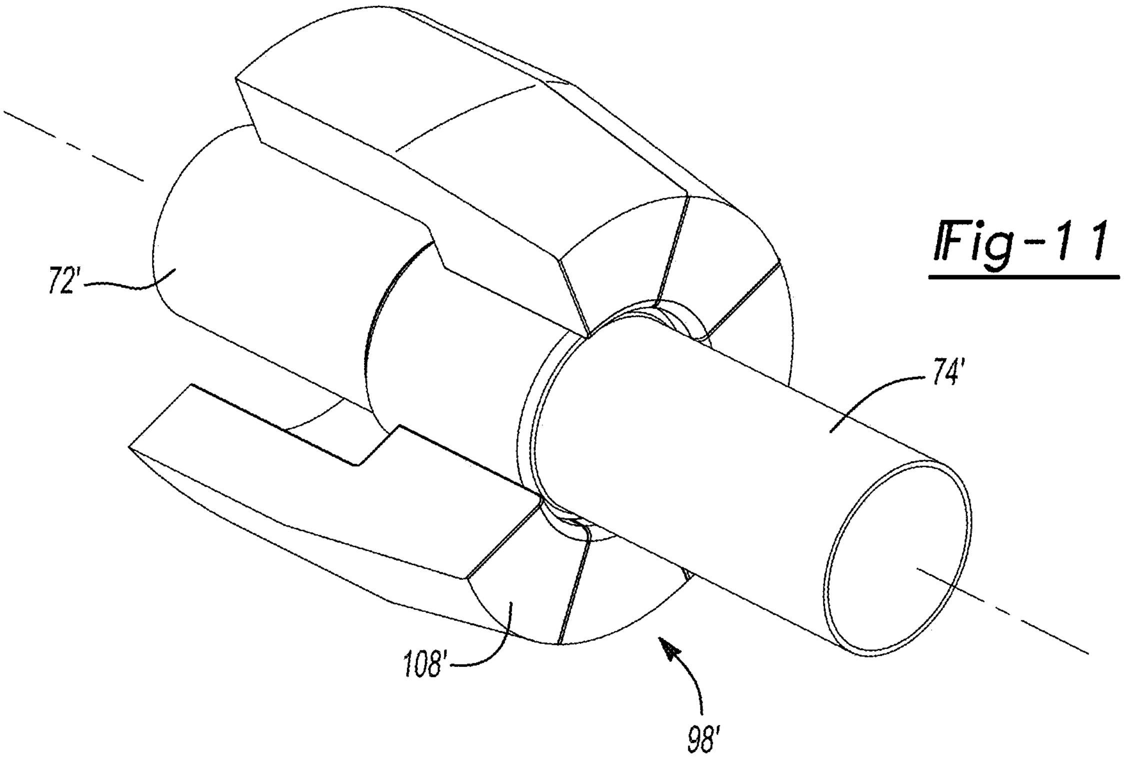
FIG. 11 provides a fragmentary prospective view of an exemplary tool associated with work-in-process pipes.
Figure 12:
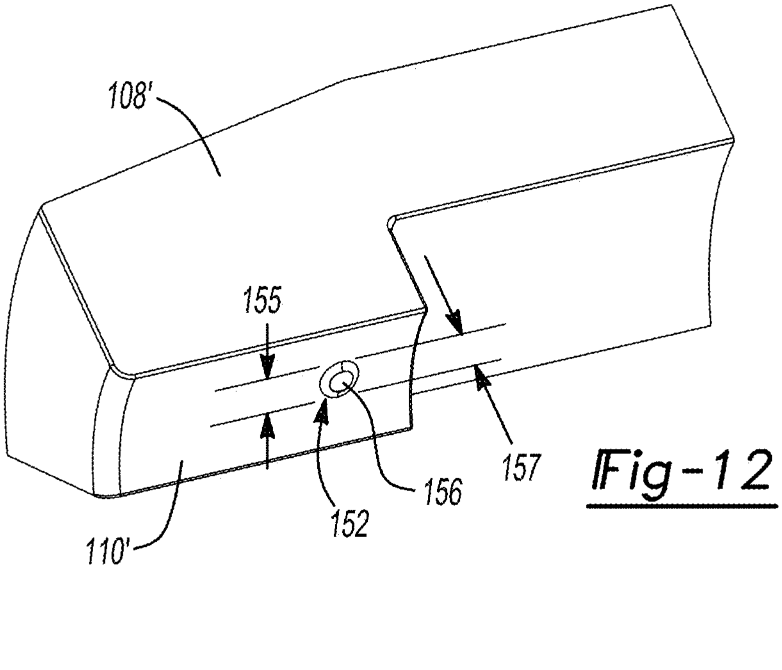
FIG. 12 is a perspective view of an exemplary jaw of the tool depicted in FIG. 11.

With reference to FIGS. 10A, 10B and 10C, the final steps of the method associated with creating joint 70' are depicted. Reference is also made to FIGS. 11 and 12 illustrating an alternate tool 98' useful in creating joint 70'. Tool 98' is substantially similar to tool 98 with the exception that at least one of the plurality of moveable jaws includes a radially inwardly extending projection 152 and is identified as jaw 108'. Some or all of the other jaws 108' may include a similar projection 152. Some of the jaws of tool 98' may be configured substantially the same as jaws 108. Specifically, some jaws may include radially inwardly extending projection 152 and others may not. FIG. 10A depicts a circumferentially alternating arrangement with every other jaw being the first type of jaw 108 that includes a relatively smooth and partially cylindrically shaped working surface 110 without the provisional of a projection and the others being jaws 108' including projection 152. FIG. 10A depicts jaws 108, 108' radially spaced apart from outer surface 82' of first pipe 72'. To begin the joint forming process, a drive mechanism (not shown) radially inwardly moves each of jaws 108, 108' toward longitudinal axis 73'.

FIG. 10B depicts another snapshot in time where jaws 108, 108' have been radially inwardly moved a distance sufficient to have a tip 156 of projection 152 engage outer surface 82' of first pipe 72'. Projection 152 radially inwardly extends a distance 157 from working surface 110 as shown in FIG. 13A and a diameter 155 (FIG. 12). Beginning at this time and up until working surface 110' engages outer surface 82', a recess 158 having the size and shape of projection 152 will be formed in at least first pipe 72'. This step is shown as an optional step in the flowchart of FIG. 6 as step 159. A similar recess 158 will be formed at all locations where a projection 152 exists. It is envisioned that this portion of the joint forming process will cause little to no deformation of second pipe 74'.

FIG. 10C depicts tool 98' and pipes 72', 74' at the completion of the formation of joint 70' obtained by further radially inwardly moving each of jaws 108, 108' toward longitudinal axis 73'. During this last phase of forming joint 70', working surfaces 110, 110' are drivingly engaged with outer surface 82' of first pipe 72' to simultaneously reduce the diameter of first pipe 72' and second pipe 74'.

It should be appreciated that the actuation of tool 98' in this manner creates a complex stress field in both first pipe 72' and second pipe 74'. The stress pattern induces material of both first pipe 72' and second pipe 74' to move. During the radial reduction phase as depicted in FIG. 10C, material flows differently in a circumferential direction versus an axial direction parallel to longitudinal axis 73. The hoop strength in the circumferential direction restricts flow of material in the circumferential direction. Material is more likely to flow in the axial direction. As a result, the initial formation of recess 158 is followed by localized elongation of dimple 150. As jaws 108, 108' radially inwardly translate to reduce the outer diameter of first pipe 72' and second pipe 74', the tooling constrains certain portions of the pipes in an interesting manner when projection 152 is present.

Figure 13:
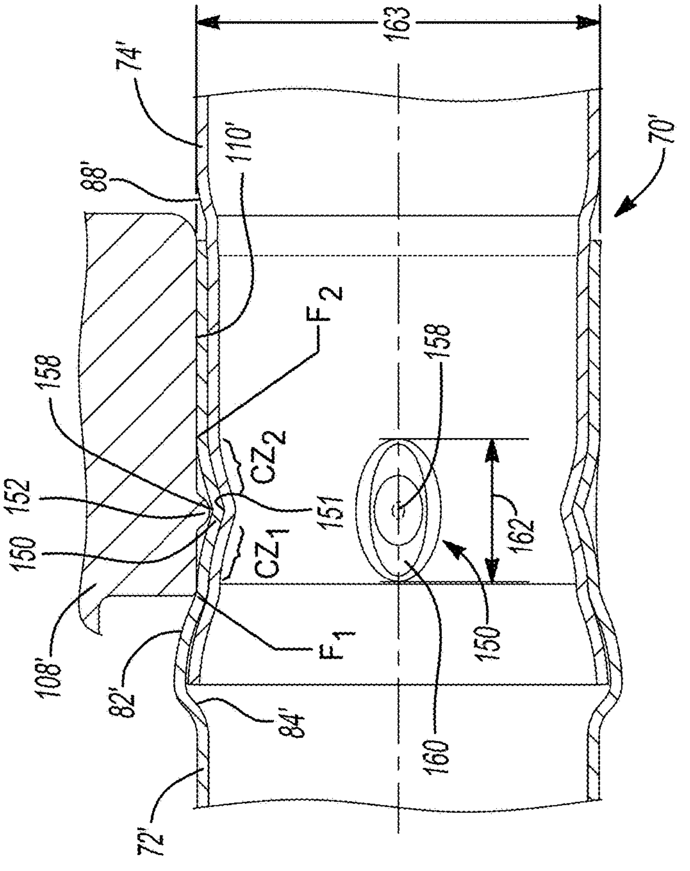
FIG. 13 is a cross-sectional view depicting deformed and interconnected first and second pipes including a dimple.
Figure 13A:
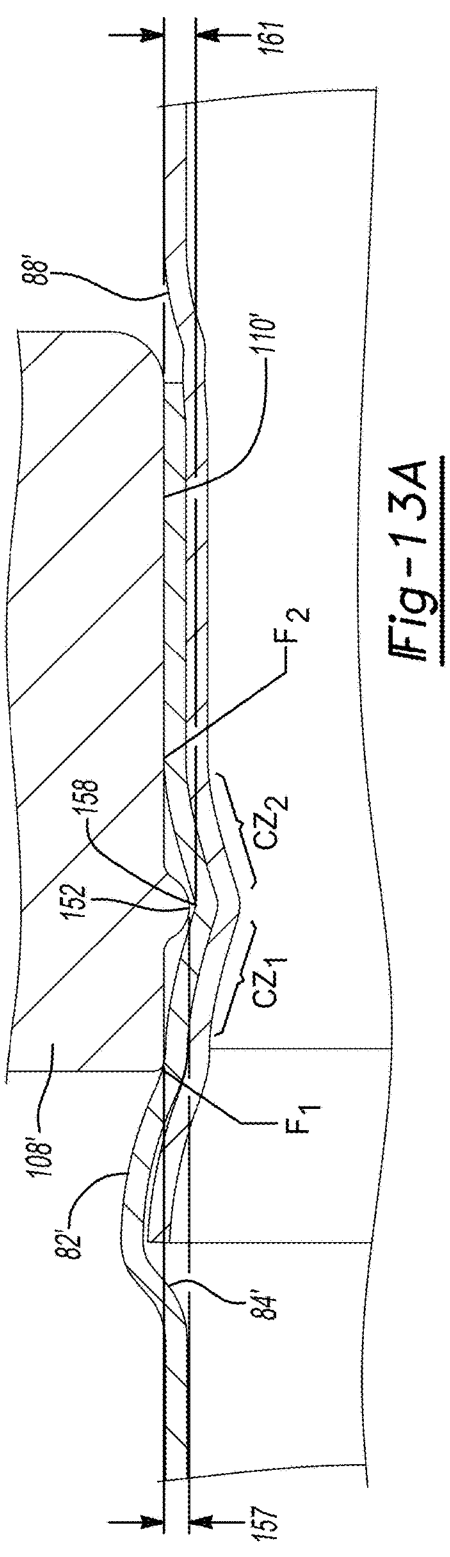
FIG. 13A is an enlarged fragmentary cross-sectional view of a portion of FIG. 13.

As best shown in FIG. 13, jaw 108' constrains first pipe 72' and second pipe 74' from movements at points $F_1$ and $F_2$ once working surface 110 drives outer surface 82' radially inwardly. An interesting phenomenon occurs, however, in a region axially positioned between the two constraints $F_1$, $F_2$. A first compression zone $CZ_1$ is formed axially between constraint 1 and projection 152. Material of first pipe 72 and second pipe 74 is compressed within compression zone $CZ_1$ and material thickness of both pipes increases. Similarly, a second compression zone $CZ_2$ is formed between constraint $F_2$ and projection 152. The material of both pipes 72', 74' is under compression in compression zone $CZ_2$ and the wall thickness of the pipes in this zone increases. This phenomenon causes outer surface 82 of first pipe 72 to become spaced apart from tip 156 of projection 152. The material within recess 158 does not experience compression and thickening as previously described in relation to compression zone CZ and compression zone $CZ_2$.

Based on the movements of jaws 108, 108' previously described, a central portion of dimple 150 includes a recess 158 that substantially mimics the size and shape of projection 152. The remainder of dimple 150 is an elongated shape initially based on the shape of projection 152 but axially elongated based on the cylindrical shape of pipes 72', 74' and the radial compression motion of jaws 108'. In the example depicted in FIG. 13, projection 152 is shaped substantially as a hemisphere having a diameter. As such, recess 158 exhibits a hemispherical shape. The remainder of dimple 150 exhibits an elliptical shape as indicated at reference numeral 160. The major axis of the ellipse extends a distance 162 that is several times the magnitude of projection diameter 155.

The result of steps 10A-10C includes forming dimples in both first pipe 72 and second pipe 74. The process defines corresponding dimple and pocket structures in first pipe 72 and second pipe 74, respectively. Radially inwardly extending dimple 150 in first pipe 72 and a corresponding pocket 151 in second pipe 74 are simultaneously formed such that an intimate direct engagement is provided between inner surface 84' of first pipe 72' and outer surface of 88' of second pipe 74' to form a mechanical interlock. Relative rotation between first pipe 72' and second pipe 74' is restricted by the mechanical interlock. Depending on the magnitude of torque that is to be resisted, the number of mechanical interlocks, such as dimple 150 and pocket 151 pairs, may be varied.

To maintain the desired sealing characteristics of joint 70', it is important to only deform first pipe 72' and second pipe 74' an amount sufficient to obtain an anti-rotation function. A greater dimple depth may lead to increased localized buckling. In areas of buckling, separation between inner surface 84' and outer surface 88' may occur. In one example, dimple 150 has a maximum depth 161 at the bottom of recess 158 as shown in FIG. 13A. In this non-limiting example, maximum depth 161 is less than the amount of radial reduction imparted on first pipe 72' during the diameter reducing step. Maximum depth 161 is less than one-half the difference between outer diameter 92' (FIG. 8) and a diameter 163 (FIG. 13) of the reduced diameter portion defined by working surface 110'.

Figure 14:
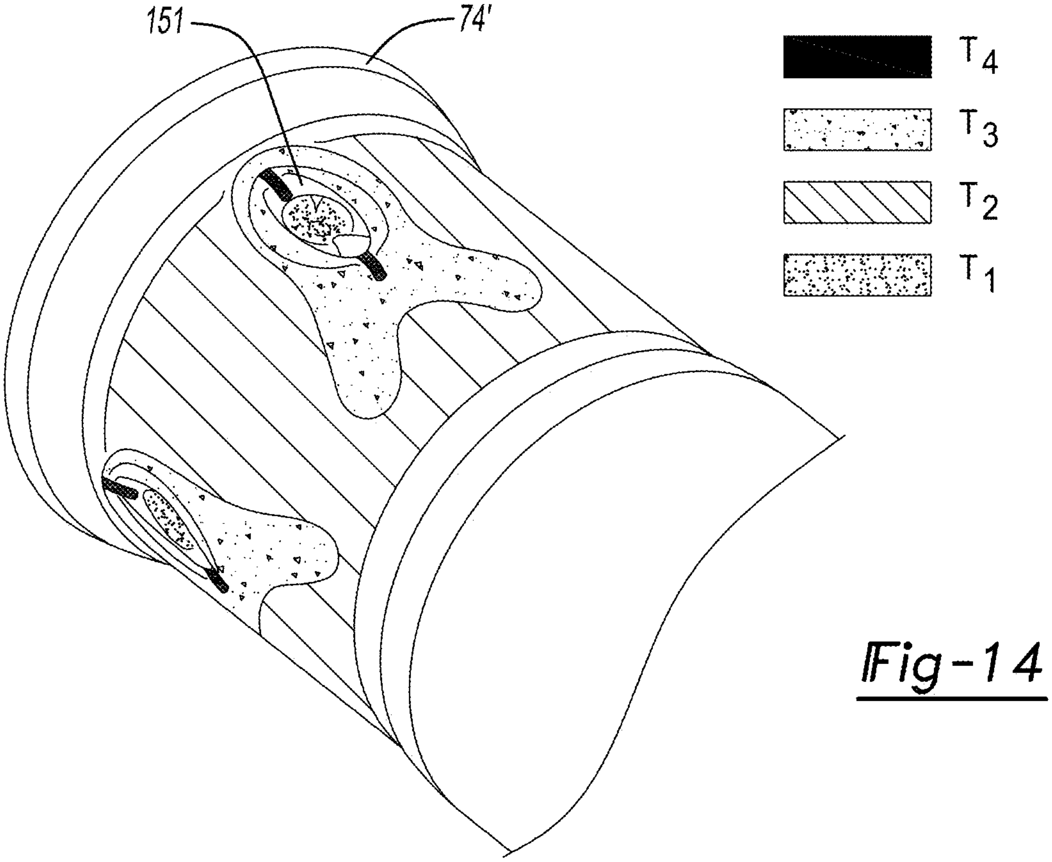
FIG. 14 is a fragmentary perspective view of an outer surface of the second pipe including surface shading indicating relative thickness of the pipe wall.

It is desirable to provide areas of joint 70' where buckling does not occur at the interface between first pipe 72' and second pipe 74'. FIG. 14 depicts outer surface 88' of second pipe 74' after the formation of joint 70' has been completed. First pipe 72' removed for illustration purposes only. This graphic illustrates zones in which buckling may occur as well as zones where buckling does not occur. The zones in which buckling does not occur are much more likely to be characterized as surfaces that are sealingly engaged with one another to form a joint meeting leak rate specifications. In particular, zones that are cross-hatched according to $T_2$ exhibit minimal thickness increase with little chance of buckling. This area completely surrounds dimple 150. Zone $T_3$ exhibits a slightly further increased cross-sectional thickness of the pipe but buckling is not present. As such, this zone also provides sealing engagement between first pipe 72' and second pipe 74' sufficient to leak less than 8 slpm. Zone $T_4$ is associated with a relatively high cross-sectional thickness increase and a high likelihood of buckling in this zone. A sealed interface should not be expected in this zone.

On the opposite end of the spectrum, zone $T_1$ exhibits little to no wall thickness increase and may exhibit a decrease wall in thickness as compared to the original wall thickness $T_2$ as shown in FIG. 2. The wall thickness reduction may be due to the initial radial enlargement procedure or the engagement of the projection 152 with first pipe 72' during step 10B. Regardless, it should not be expected for this zone to exhibit sealed joint characteristics.

Figure 15:
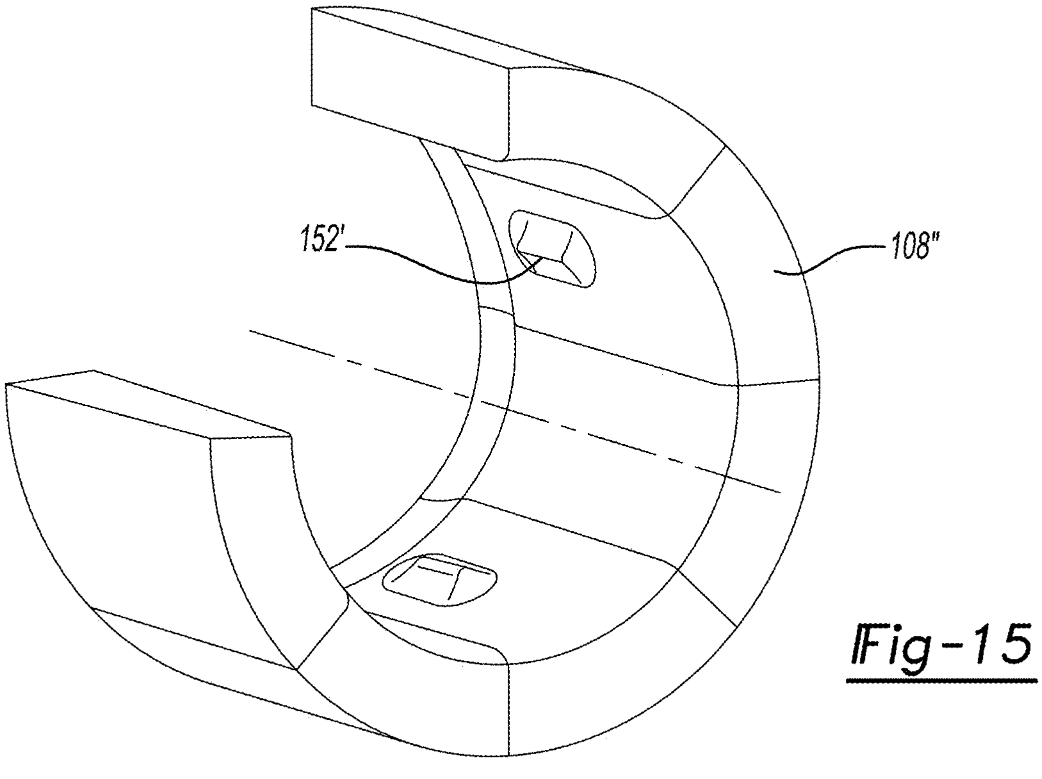
FIG. 15 is a partial perspective view of an alternate embodiment tool.
Figure 16:
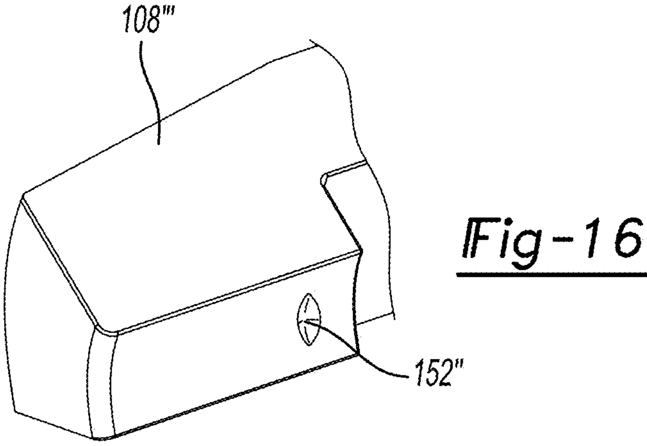
FIG. 16 is a fragmentary perspective view of an alternate embodiment of a tool.

FIGS. 15 and 16 depict alternate embodiment jaws 108" and 108". These figures merely illustrate the fact that projection 152 may be alternately shaped as projection 152' in FIG. 15 or projection 152" in FIG. 16. As previously mentioned, it should be expected that the initial recess formed by a projection will closely mimic the size and shape of the projection itself. The shape of the resultant dimple after radial reduction of first pipe 72' and second pipe 74' should be expected to be axially elongated as previously described in relation to projection 152 and dimple 150.

Figure 17:
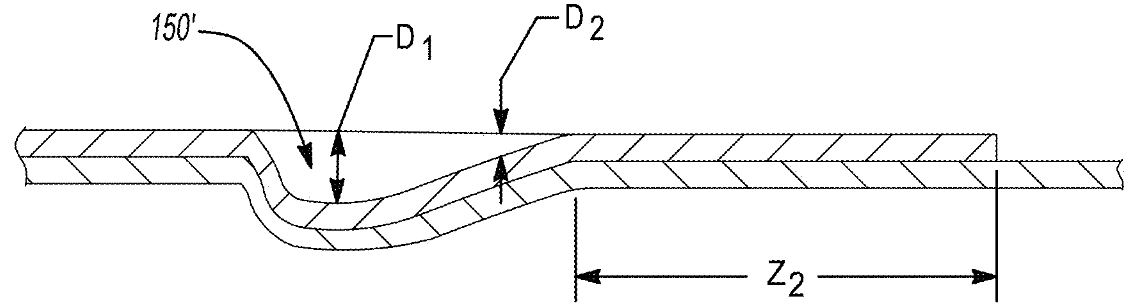
FIG. 17 is a fragmentary cross-sectional view of a dimple having an asymmetrical cross-section.

FIG. 17 depicts a portion of an alternate exemplary joint embodiment depicting a dimple 150' created using a tool (not shown) with a projection having an asymmetrical cross-section in the axial direction. The projection is shaped to create a deeper indentation as identified $D_1$ at a first axial location and gradually taper to have a decreasing depth as illustrated at $D_2$. The shallow end at $D_2$ is positioned closer to Zone 2, $Z_2$, than the deeper portion $D_1$. This dimple shape minimizes the likelihood of material buckling near the pipe surfaces provided in zone 2. A more robust design results.

Figure 18:
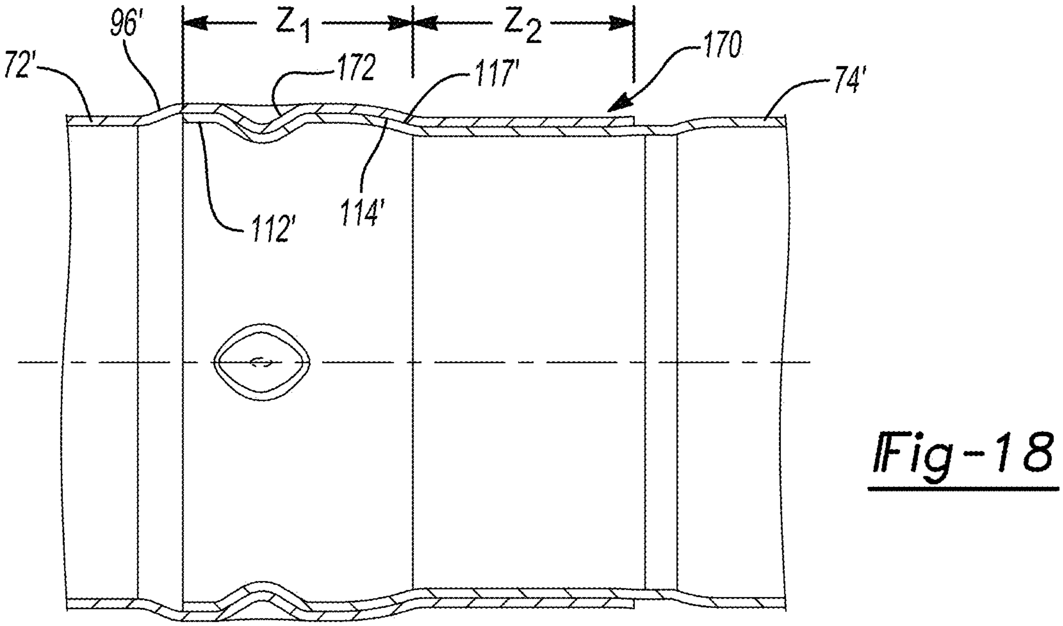
FIG. 18 is a cross-sectional view of an alternate embodiment joint between first and second pipes.
Figure 19:
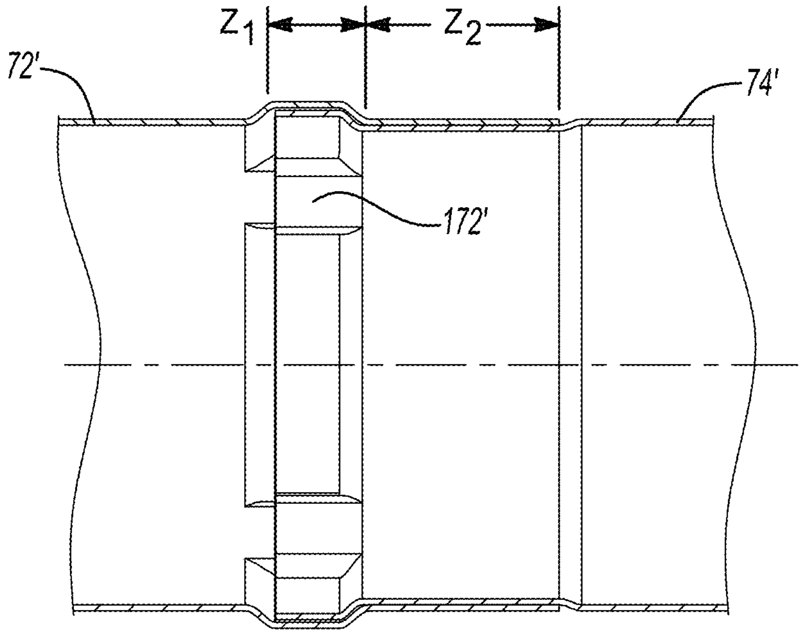
FIG. 19 is a cross-sectional view of an alternate embodiment joint between first and second pipes.

FIGS. 18 and 19 illustrate further alternate embodiment joints 170 and 170'. These joints differ from joint 70' by positioning a dimple 172 in Zone 1 ($Z_1$) proximate a terminal end portion 112' of second pipe 74'. Zone 1 of joints 170, 170' now contains two of the joint features. In particular, relative axial movement is restricted by first seat 114' in cooperation with second seat 117'. Relative axial movement in the opposite direction is restricted by terminal end portion 112' and transition zone 96'. The anti-rotation feature is provided by dimples 172 as previously described in relation to dimples 150. One of the differences between the embodiments is that an overall axial length of joints 170, 170' may be reduced by providing dimple 172 in Zone 1 thereby allowing Zone 2 to have a predetermined length that is uninterrupted by dimples to thereby provide a joint with surfaces in sealing engagement with one another. FIG. 19 provides another way of accomplishing the goal of minimizing joint length. Joint 170' of FIG. 19 is constructed using an alternate embodiment tool that has circumferentially spaced apart castellations allowing the resultant cross-sectional shapes of dimples 172' in Zone 1, $Z_1$, with other portions of the tool providing a substantially constant reduced outer diameter as depicted in Zone 2.

Figure 20:
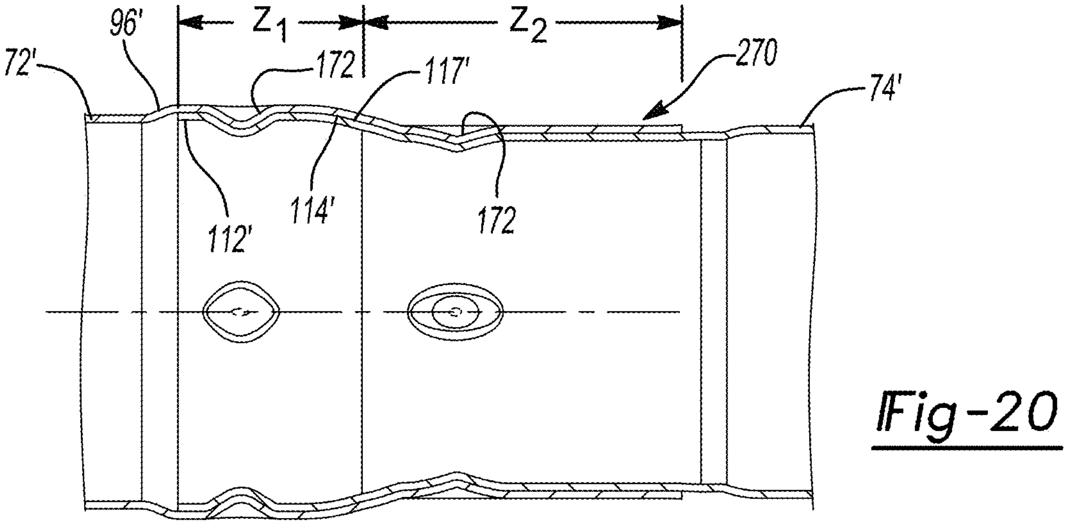
FIG. 20 is a cross-sectional view of an alternate embodiment joint between first and second pipes.

FIG. 20 depicts another alternate joint identified at reference numeral 270. This joint is substantially similar to joint 170 with the addition of at least one more dimple 172 axially spaced apart from the dimple or dimples 172 positioned in Zone 1, $Z_1$. The additional dimple, as depicted in this figure, is positioned in Zone 2, $Z_2$. Such an arrangement may be desirable to further increase resistance to relative rotation between first pipe 72' and second pipe 74'. It should be appreciated that a second row of circumferentially spaced apart dimples, such as dimples 172, may be added to any of the previously described embodiments. For example, the arrangement depicted in FIG. 19 may include a second row of circumferentially and spaced apart dimples similar to dimples 172 axially spaced apart from the structured depicted in Zone 1, $Z_1$.

Figure 21:
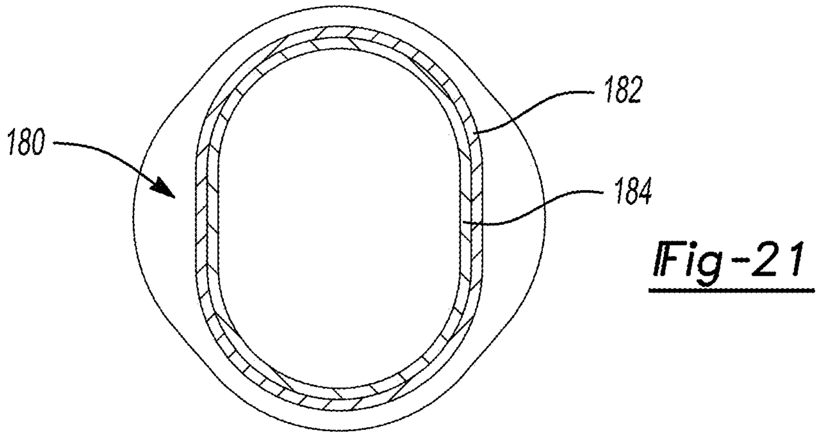
FIG. 21 is a cross-sectional view depicting non-circular cross-sectional portions of the first and second pipes.

FIG. 21 depicts another alternate embodiment joint 180. Joint 180 is substantially similar to any one of the joints previously described with the exception of the cross-sectional shape of the pipes. In joint 180, a first pipe 182 overlaps a second pipe 184. At least some of the overlapped pipe portions exhibit non-circular cross-sections. For example, a cross-sectional shape may include flattened wall portions or an oval shape such that relative rotation between first pipe 182 and second pipe 184 is restricted.

Figure 22:
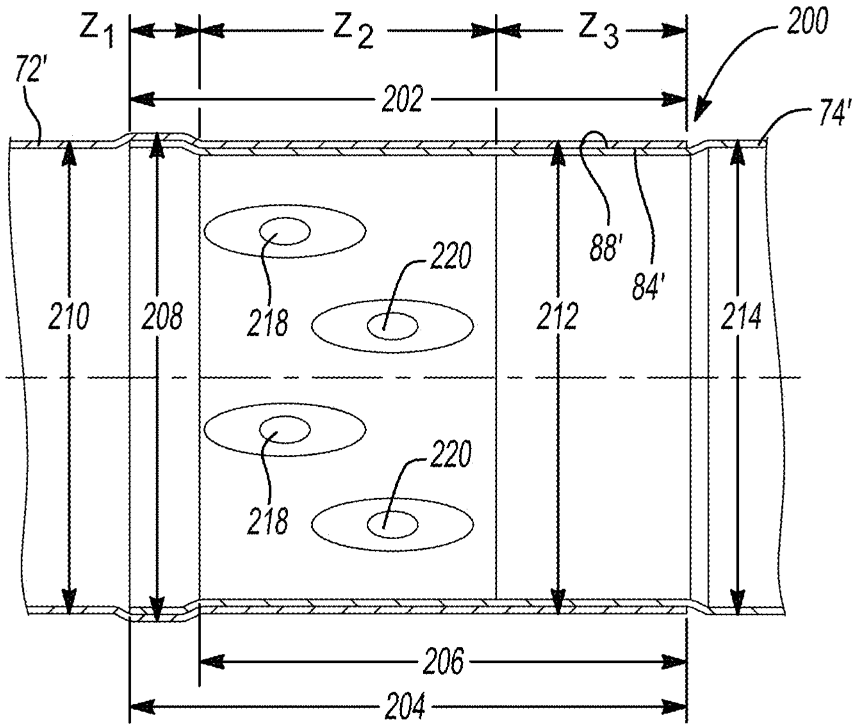
FIG. 22 is a cross-sectional view of another alternate embodiment interconnection between first and second pipes.

FIG. 22 illustrates another joint 200 substantially similar to joint 70' depicted in FIG. 13 and joint 170 depicted in FIG. 17. Joint 200 includes clearly delineated portions or zones with each zone configured to perform a particular function. As previously described, first pipe 72' includes an enlarged diameter end portion that extends for an axial length 202. The length of the overlap between first pipe 72' and second pipe 74' is indicated as an axial length 204. The outer diameter of first pipe 72' at the enlarged diameter end portion is labelled as having a dimension 208 while the original outer diameter is indicated at 210. The length 204 of first pipe 72' that has been enlarged is substantially the same as the axial length 204 of the overlap. During the mechanical downsizing steps previously described, the outer diameter of first pipe 72' is radially reduced for an axial length 206 corresponding to the axial extent of Zone 2 and Zone 3. The outer diameter of first pipe 72' at the reduced diameter portion is labelled as having a dimension 212. The outer diameter 212 at the reduced diameter portion is equal to or less than the original outer diameter 214 of second pipe 74' as well as the original outer diameter 210 of first pipe 72'.

Joint 200 may be characterized as having three separate zones positioned adjacent to one another. Zone 1, as previously described includes an arrangement with overlapped pipes that have not been contacted with a tool for radial size reduction. At Zone 2, $Z_2$, the diameter of both pipes 72', 74' are radially reduced at the same time such that one or more dimples 218 are provided. Dimples 218 are circumferentially spaced apart from one another at a first axial position. As described earlier in this paper, a second, third or fourth row of dimples 220 may be circumferentially spaced apart from one another and positioned at different axial locations than dimples 218. Zone 3 contains an axial length of the overlapped pipes that has been reduced in diameter. Zone 3 is free of dimples or other deformations to provide sealing engagement between an inner surface 84' of first pipe 72' and an outer surface 88' of second pipe 74 for an axial length having a magnitude sufficient to achieve leak rate targets.

Joint 200 purposefully positions Zone 1 furthest from Zone 3. Zone 1 may exhibit separation or a gap between first pipe 72' and second pipe 74'. Zone 3 is arranged to provide the best sealing engagement between the pipes. The spacing assists in increasing the likelihood of providing the desired minimized leak characteristics. Arranging the zones as depicted in FIG. 22 also increases the bending strength of the joint. Pipe wall sections that have been reduced in wall thickness are doubled at the overlap. Other portions.

Typical examples of exhaust pipes mechanically joined as discussed in this document may range from 1.75 inches to 4 inches in outer diameter. The axial overlap of components in a single joint may range from 1-4 inches.

Figure 23:
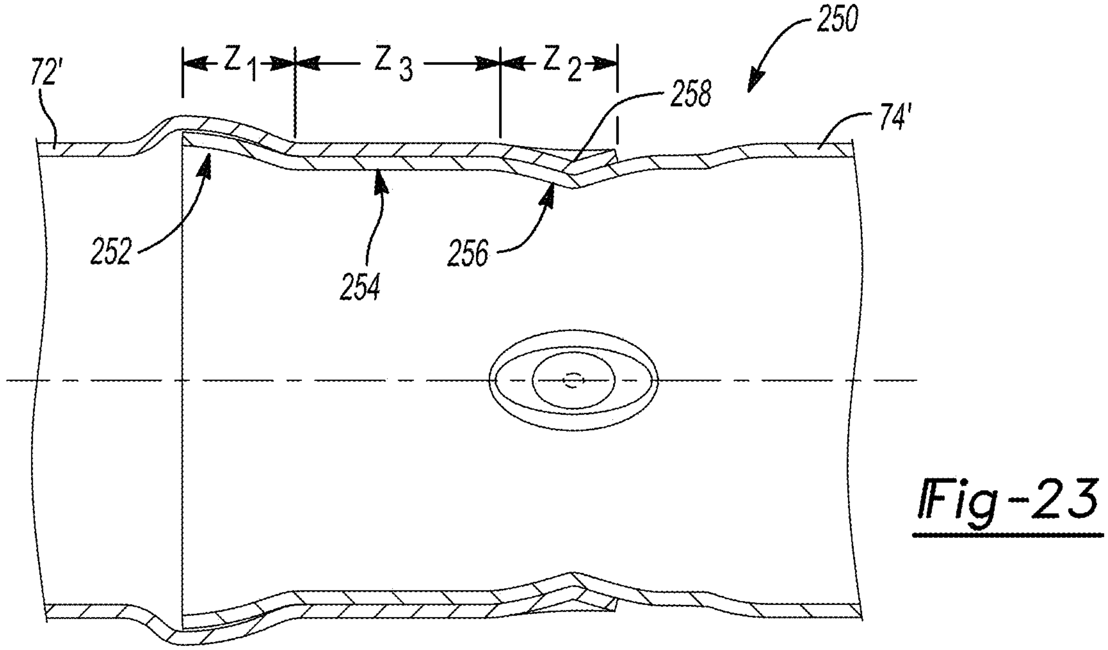
FIG. 23 is a cross-sectional view of another alternate embodiment interconnection between first and second pipes.

It is also contemplated to switch the axial position of the various zones relative to one another as depicted in FIG. 23 defining a joint 250. Joint 250 includes Zone 1 at reference numeral 252 constructed in the same manner as previously described. Immediately adjacent Zone 1 is Zone 3 at numeral 254 characterized by reduced outer diameters of both first pipe 72' and second pipe 74'. Within Zone 3 at reference numeral 254, the pipe sections are substantially cylindrical and smooth without the presence of dimples. Zone 2 is furthest away from Zone 1, immediately adjacent Zone 3, and depicted with reference numeral 256. As previously discussed, Zone 2 includes one or more dimples 258 to restrict relative rotation between first pipe 72' and second pipe 74'.

Figure 24:
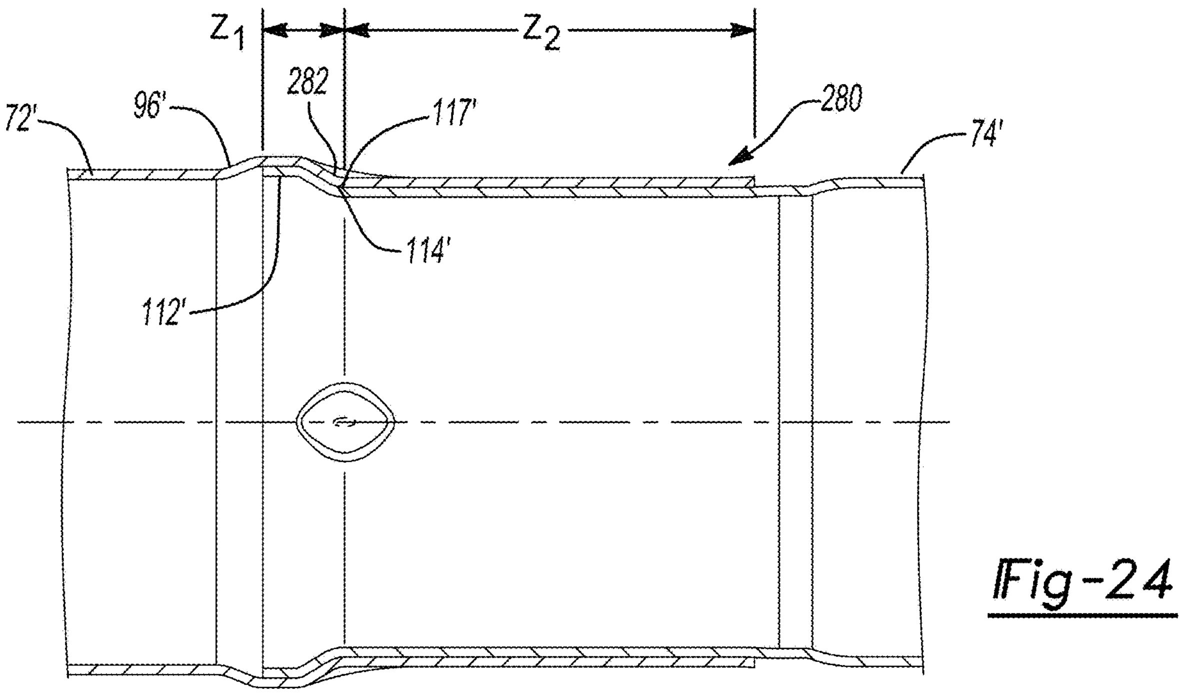
FIG. 24 is a cross-sectional view of another alternate embodiment interconnection between first and second pipes.
Figure 25:
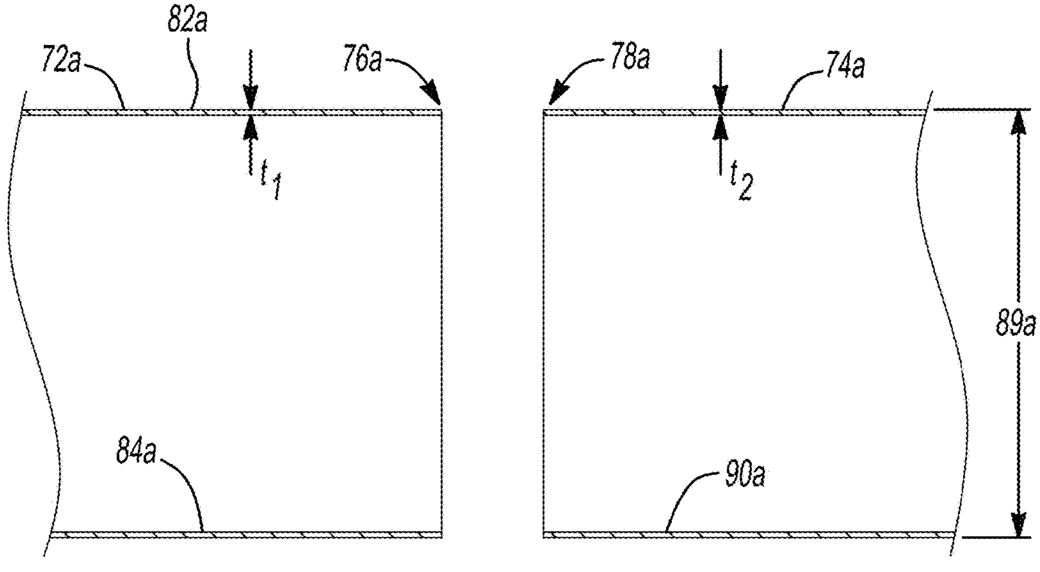
FIG. 25 is a cross-sectional view of another alternate first pipe and second pipe prior to a mechanical interconnection.
Figure 26:
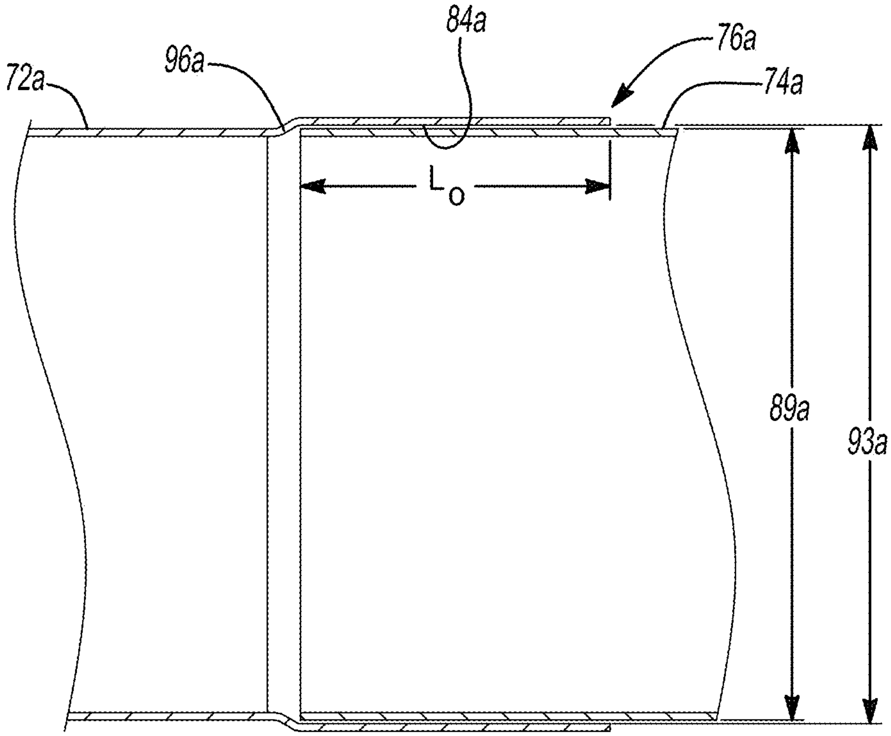
FIG. 26 is a cross-sectional view of a work-in-process step relating to interconnecting the first pipe and second pipe depicted in FIG. 25.
Figure 27:
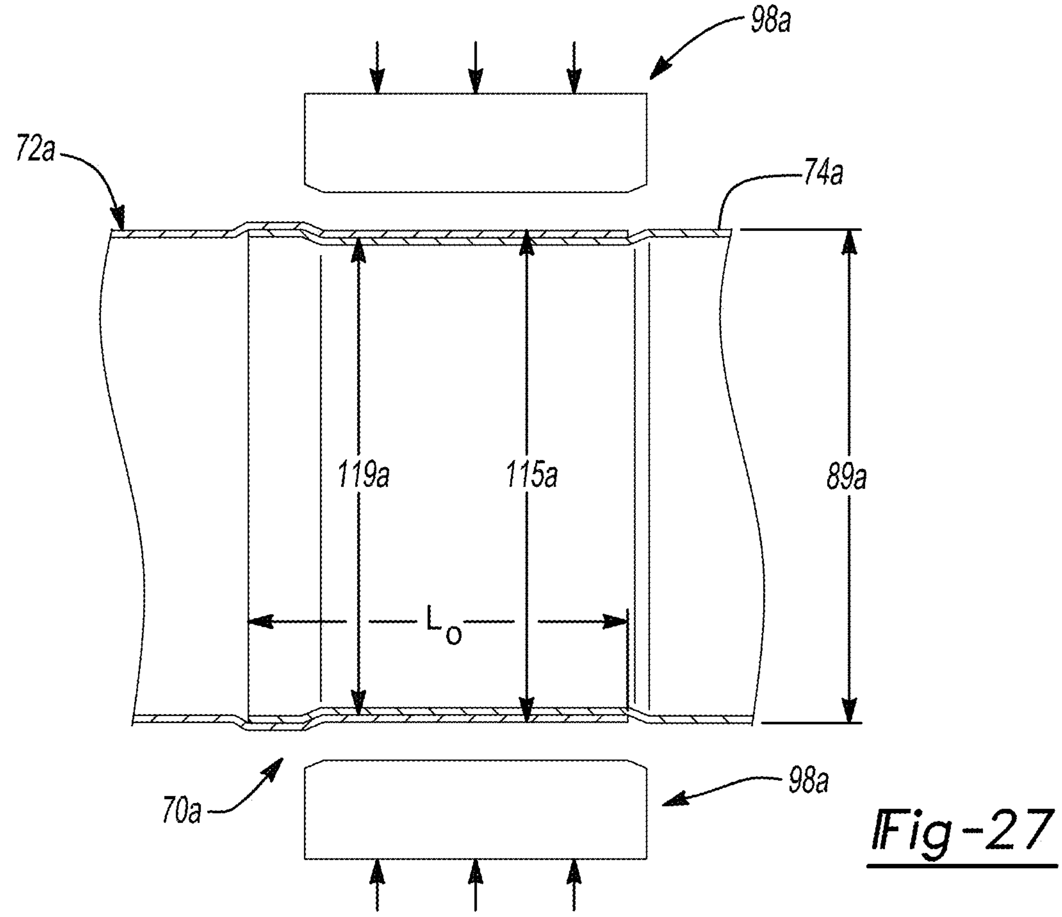
FIG. 27 is a cross-sectional view depicting deformed and interconnected first and second pipes.

FIGS. 25-27 visually depict the alternate process first mentioned in paragraph with reference to second pipe 74 not including an enlarged outer diameter at second end 78. A joint **70*a* is depicted in FIG. 27. Joint 70*a* is substantially similar to joint 70. As such, like elements will retain their previously introduced reference numeral including an "a" suffix. FIG. 25 depicts first pipe 72*a* and second pipe 74*a*** having the same outer diameter 89*a*. FIG. 26 shows an enlarged first end 76*a* of first pipe 72*a* including an inner diameter 93*a*. Inner diameter 93*a* is larger than outer diameter 89*a* of second pipe 74*a* to provide a slip-fit interconnection as previously described. FIG. 27 depicts tool 90*a* radially inwardly extending to deform a portion of first pipe 72*a* and second pipe 74*a*. The same matter previously discussed, a reduced diameter portion of first pipe 72*a* results in an outer diameter 115*a*. outer diameter of the reduced portion of second pipe 74*a* exhibits a diameter 119*a*. It should be appreciated that diameter 119*a* is less than original diameter 89*a* of second pipe 74*a*. Also as previously discussed, outer diameter 115*a* of the reduced portion of first pipe 72*a* may exhibit a diameter the same as or less than original diameter 89*a* of second pipe 74*a*. Yet another alternate embodiment is shown in FIG. 24. It is contemplated that a joint 280 includes a dimple 282 at least partially positioned in Zone 1 and partially positioned in the adjacent zone having a reduced outer diameter and identified as Zone 2 in FIG. 24.

Another alternate embodiment that is not depicted in the figures is also envisioned where first pipe 74 has a constant cylindrical shape and inner diameter that is slightly larger than a second pipe 74 that includes a substantially constant outer diameter that is slightly lesser in size than the inner diameter of first pipe 74. The pipes may be overlapped as previously described. Any of the joints or portions of the joints previously described may be constructed in accordance with the alternate embodiments without departing from the scope of the present disclosure.

Another exemplary joint 370 constructed in accordance with the teachings of the present disclosure is depicted in FIGS. 28-31. Joint 370 includes a first pipe 372 is sealing fixed to a second pipe 374. First pipe 372, second pipe 374 and joint 370 extend along a longitudinal axis 373 and are adapted to transport exhaust emitted from the internal combustion engine (not shown) to atmosphere.

Figure 28:
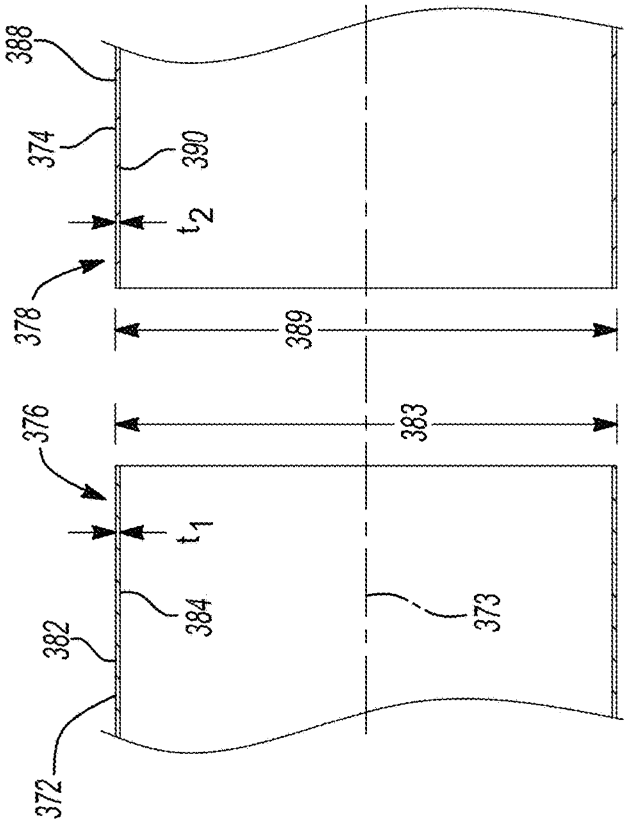
FIG. 28 is a cross-sectional view of a first pipe and a second pipe prior to mechanical interconnection.

First pipe 372 includes a first end 376. Second pipe 374 includes a second end 378. Joint 370 is formed to sealingly interconnect first end 376 of first pipe 372 with second end 378 of second pipe 374. In the example depicted, first pipe 372 includes an outer surface 382 defining an outer diameter 383 and an inner surface 384 defining an inner diameter of first pipe 372. First pipe 372 has a substantially constant wall thickness $t_1$. Similarly, second pipe 374 includes an outer surface 388 having an outer diameter 389 as well as an inner surface 390 defining an inner diameter of second pipe 74. Second pipe 374 includes a substantially constant wall thickness $t_2$. In the embodiment depicted in FIG. 2, the initial inner diameter, outer diameter, and thickness of first pipe 72 are substantially the same as the corresponding initial characteristics of second pipe 74. This initial arrangement is depicted in FIG. 28. It should be appreciated that the first and second pipes having the same dimensional characteristics is merely exemplary and that the present disclosure should not be limited in such a way. Pipes having different wall thicknesses or material types are contemplated as well as pipes having different initial outer diameters or inner diameters.

Figure 29:
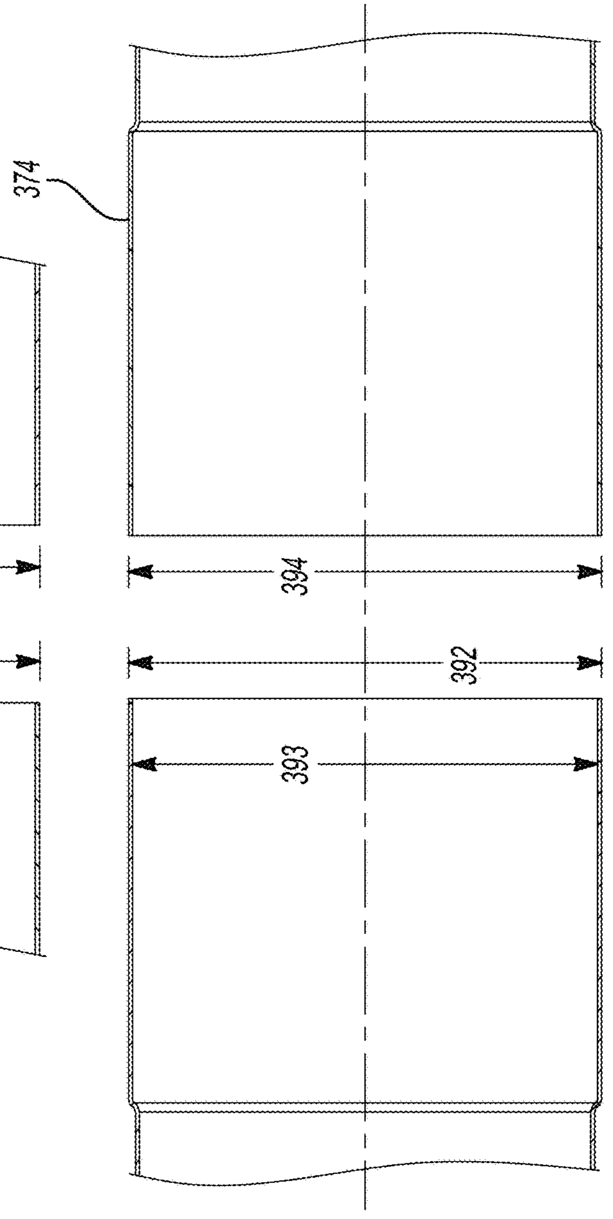
FIG. 29 is a cross-sectional view of a work-in-process step relating to interconnecting the first pipe and a second pipe depicted in FIG. 28.
Figure 32:
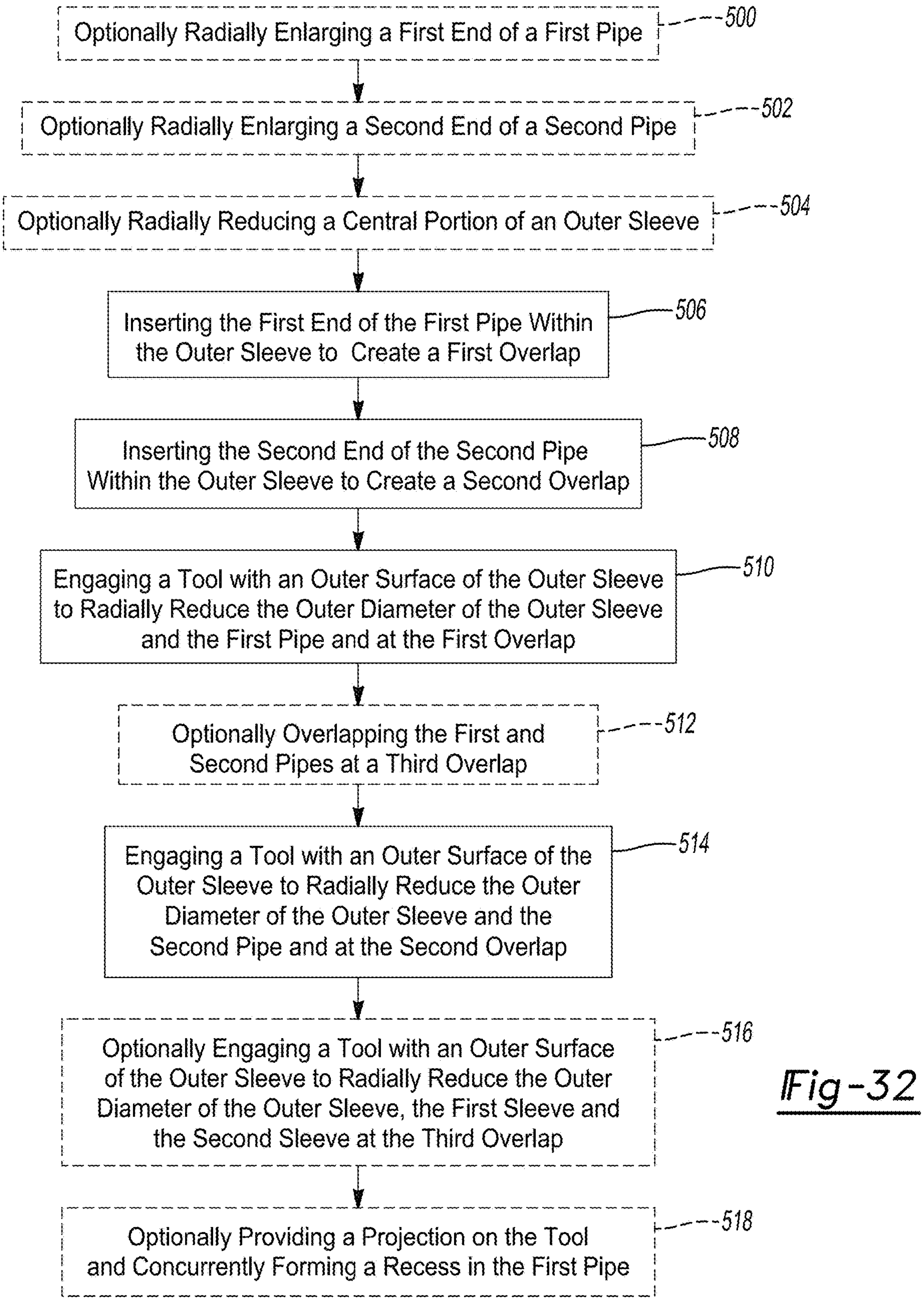
FIG. 32 is a flow chart describing another method of interconnecting pipes.

FIG. 29 visually depicts a first step in a mechanical joining process for creating joint 370 without welding. FIG. 32 provides a flow chart reciting the steps of a method of forming joint 370. The process includes enlarging the inner diameter and the outer diameter of first end 376 of first pipe 372 at step 500. The enlarged outer diameter of first pipe 372 is identified as diameter 392 and the enlarged inner diameter is noted at reference numeral 393. The inner diameter and the outer diameter of second end 378 of second pipe 374 are enlarged. The enlarged outer diameter of second pipe 374 is identified as diameter 394.

Figure 30:
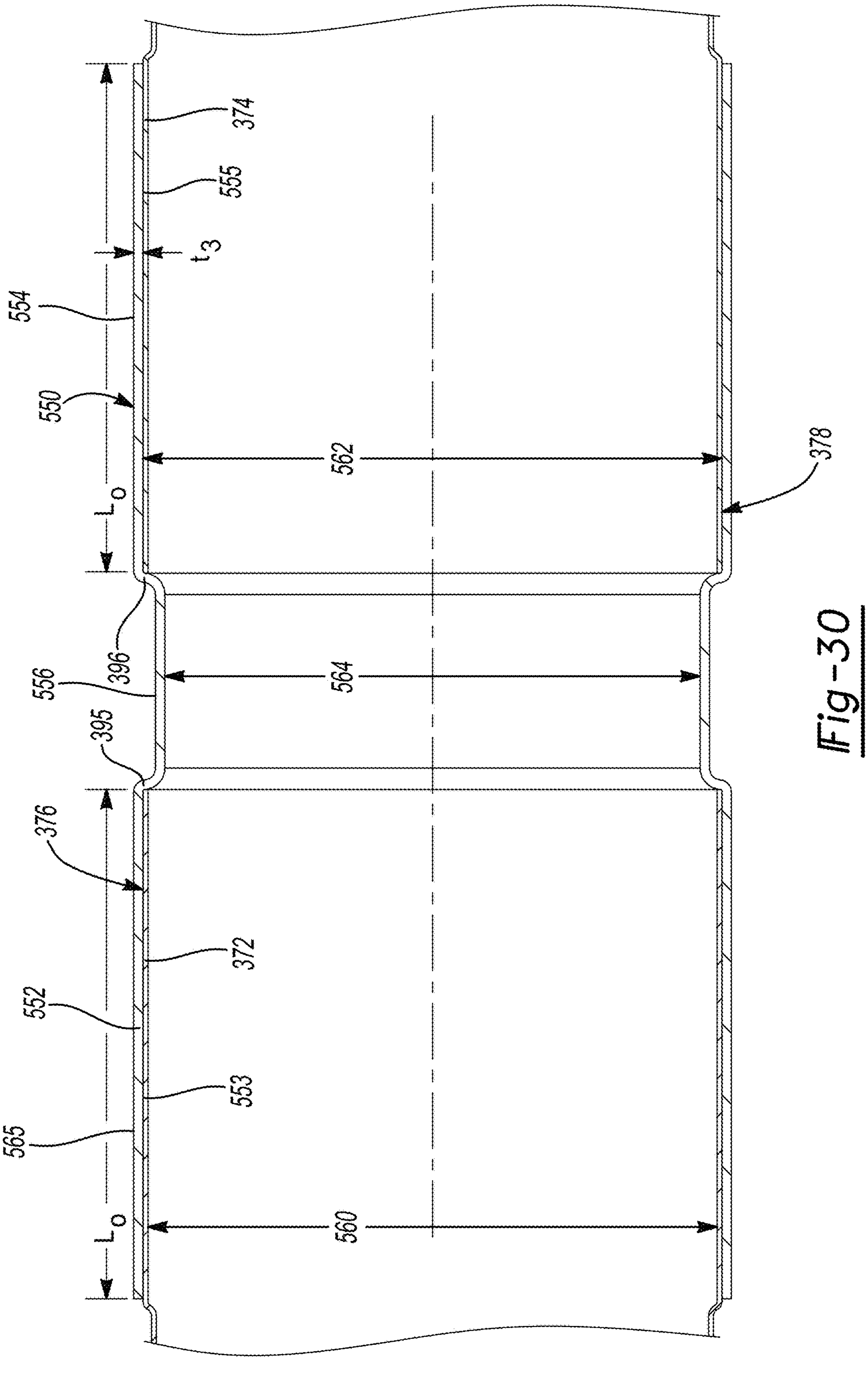
FIG. 30 is a cross-sectional view of a work-in-process step relating to interconnecting the first pipe and a second pipe depicted in FIG. 29 with an outer sleeve.

FIG. 30 depicts an outer sleeve 550 having a wall thickness $t_3$ that is significantly greater than the wall thicknesses $t_1$ and $t_2$ previously discussed. Use of outer sleeve 550 allows for $t_1$ and $t_2$ to be reduced possibly even further than previously described in this paper. Accordingly, the weight of the first pipe 372 and the second pipe 374 will be proportionally reduced. It is envisioned that the outer sleeve wall thickness $t_3$ is 1.2 to 3.0 times $t_1$ or $t_2$. In the figures, joint 370 is shown having t equal to $t_2$.

Outer sleeve 550 includes a first portion 552, a second portion 554 and a central portion 556 positioned axially therebetween. First portion 552 includes a first inner surface 553 having a first inner diameter 560. Second portion 554 includes a second inner surface 555 including a second inner diameter 562. Central portion 556 includes a radially reduced inner diameter identified at reference numeral 564. In the example depicted in FIGS. 28-31, the first inner diameter 560 of outer sleeve 550 at first portion 552 is sized to receive first end 376 of first pipe 372 in a slip fit arrangement after the enlargement of first end 376. To achieve this geometrical interrelationship, first end 376 of first pipe 72 is enlarged an amount to be received within first portion 552 of outer sleeve 550. Inner diameter 560 is greater than enlarged outer diameter 392. Similarly, enlarged outer diameter 394 of second pipe 374 is slightly less than inner diameter 562 of second portion 554. It should be appreciated that steps 500 and 502 may be alternatively accomplished by obtaining pipes of appropriate size to allow the pipes and outer sleeve to overlap. Step 504 includes radially inwardly deforming central portion 556 to define reduced inner diameter 564.

As shown in FIGS. 30 and 32, step 506 of the mechanical joining process includes inserting enlarged first end 376 of first pipe 372 within first portion 552 of outer sleeve 550 until first end 376 reaches a first transition zone 395. The axial length for which the components overlap one another may be termed a first overlap. Step 508 includes inserting second end 378 of second pipe 374 within second portion 554 until second end 378 is restricted from further insertion at a second transition zone 396. As such, a second overlap is defined. Transition zones 395, 396 are the areas at which the inner diameter and outer diameter of outer sleeve 550 changes from the size depicted at first portion 552 and second portion 554 in FIG. 30 to the reduced size depicted as central portion 556 in FIG. 30. After first pipe 372 and second pipe 374 are inserted within outer sleeve 550, the first and second overlaps exist. The first and second overlaps are identified in FIG. 30 as distances LO. At each pipe overlap, it is contemplated that the clearance between inner surface 553 of inner sleeve 550 and outer surface 382 of first pipe 372, as well as the clearance between inner surface 555 of inner sleeve 550 and outer surface 388 of second pipe 374 ranges from 0.002 inches to 0.120 inches.

Figure 31:
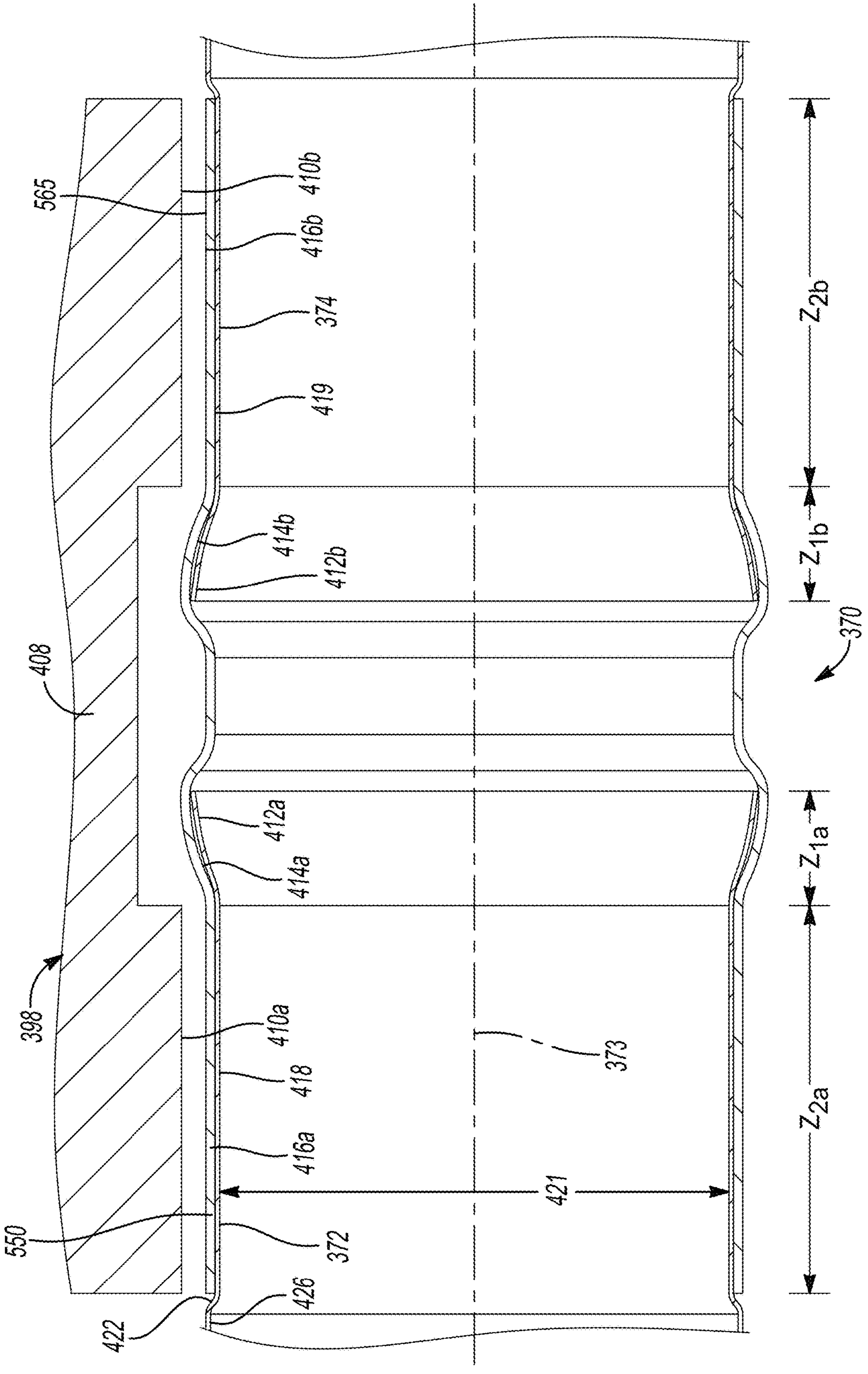
FIG. 31 is a cross-sectional view depicting deformed and interconnected first and second pipes with an outer sleeve according to another embodiment of the present disclosure.

FIG. 31 depicts first pipe 372 coupled to second pipe 374 at joint 370. Outer sleeve 550 is sealingly fixed to first pipe 372 and sealingly fixed to second pipe 374. It should be appreciated that "sealingly fixed" does not intend to mean that no leakage occurs at joint 370. Some exhaust gas may flow through joint 370 and be acceptable. For instance, a leak rate of 8.0 slpm is generally accepted for many service joints positioned downstream of emissions treatment components. This magnitude of leak may be acceptable and considered a low-leak joint having components sealingly fixed to one another.

To obtain the configuration depicted in FIG. 31, a mechanical deformation tool 398 is positioned on the outside of outer sleeve 550 circumscribing an outer surface 565 along the axial length of outer sleeve 550. No tooling is positioned within either of first pipe 372 or second pipe 374. Tool 398 is operable to radially inwardly displace not only a portion of outer sleeve 550 but also a portion of first pipe 372 and a portion of second pipe 374 about which the tool circumscribes. In one example, tool 398 may include a plurality of radially translatable jaws 408. Each jaw 408 includes longitudinally spaced apart working surfaces 410*a*, 410*b* adapted to directly and drivingly engage outer surface 565. In this embodiment, steps 510 and 514 are performed by the same tool at the same time but this is not a necessity. Tool 398 simultaneously radially reduces the outer diameter of outer sleeve 550, first pipe 372 and second pipe 374. The process may optionally continue at step 518 by performing one or more of the previously described steps, including but not limited to, providing a projection on the tool and forming a recess in the outer sleeve 550.

An axial extent of working surfaces 410*a*, 410*b* may be substantially equal to the overlap length $L_o$ or a distance less than $L_o$. FIG. 31 depicts a joint based on use of tool 398 having an axial extent of working surface 110 less than $L_o$. Accordingly, joint 370 includes different zones of relative interconnection and deformation along the longitudinal direction of axis 373. Zone 1a, identified as Z1a in the figures, includes a portion of joint 370 that is not engaged by tool 398. Similarly, Zone 1b, shown as $Z_1$b is not engaged by 410*b*. Accordingly, some of the outer surface 565 of outer sleeve 550 exhibits substantially the same outer diameter as it did prior to the radial downsizing step. The outer diameter tapers down within Zone 1a as the first pipe wall approaches Zone 2a to define a mechanical interlock formed to resist forces attempting to axially move first pipe 372 relative to outer sleeve 550 along longitudinal axis 373. Outer sleeve 550 also tapers down within Zone 1b as the first pipe wall approaches Zone 2b to define a mechanical interlock. More particularly, terminal end portions 412*a*, 412*b* of first pipe 372 and second pipe 374, respectively, remain generally uncompressed from the radial inward movement of jaws 408 and maintain the enlarged outer diameters depicted in FIG. 29. After tool 398 mechanically joins pipes outer sleeve 550, first pipe 372, and second pipe 374 to another, first seats 414*a*, 414*b* are formed on inner surfaces 553, 555 within Zone 1a and Zone 1b. First seats 414*a*, 414*b* are generally conically shaped surfaces axially extending from transition zones 395, 396 to radially reduced portions 416*a*, 416*b* of outer sleeve 550. Radially reduced portions 416*a*, 416*b* are substantially cylindrically shaped. Corresponding second seats 117*a*, 117*b* are formed on outer surfaces 382, 388 of first pipe 372 and second pipe 374, respectively. Second seat 117*a* axially extends from terminal end portion 412*a* to a radially inwardly deformed portion 418 of first pipe 372. Second seat 117*b* axially extends from terminal end portion 412*b* to a radially inwardly deformed portion 419 of second pipe 374.

First seat 414*a* and second seat 417*a* are engaged with one another to resist relative axial movement of first pipe 372 away from outer sleeve 550. Relative axial movement between first pipe 372 and outer sleeve 550 in the opposite direction is restricted by transition zone 395 and terminal end portion 412*a*. Outer surface 382 of first pipe 372 may be slightly spaced apart from inner surface 553 of outer sleeve 550 at some locations within Zone 1a. Such spaces may be present due to the relatively large change in pipe diameter required to meet axial force pullout targets. Due to the presence of these spaces, Zone 1a does not necessarily include pipe portions that are "sealing fixed" to one another. Zone 1a does not necessarily provide a joint that meets the leak rate target. As such, it may be beneficial to position Zone 1a as axially far away from the sealingly engaged pipe surfaces as possible. The interrelationship of surfaces with respect to second pipe 374 and outer sleeve 550 are substantially the same as previously described in relation to first pipe 372 and outer sleeve 550. For conciseness, repetition will be avoided.

At Zone 2a (Z2a), as the outer sleeve 550 is radially inwardly deformed at radially reduced portion 416*a*, so is the portion of first pipe 372 that is within Zone 2 and identified as radially inwardly deformed portion 418. First pipe 372 may be deformed inside of outer sleeve 550 to such an extent that an outer diameter 421 of first pipe 372 at radially inwardly deformed portion 418 is less than the original outer diameter 392 of first pipe 372. As such, a transition 422 may exist between reduced diameter portion 418 and an undeformed portion 426 of first pipe 372. The geometry of second pipe 374 may be similarly shaped by the process as previously described in relation to first pipe 372.

After creation of joint 370 as previously described, Zones 1a, 1b provide excellent resistance to relative axial movement between first pipe 372 and second pipe 374. Zones 2a, 2b provide interfaces between outer sleeve 550 and first pipe 372 and second pipe 374 that meets the leak rate targets. Zones 2a, 2b include axial extents that may be characterized as having components that are sealingly engaged with one another to provide low-leak joint 370. The mechanical deformations previously described also provide resistance to relative torsional movement between the first pipe 372 and the second pipe 374.

Figure 33:
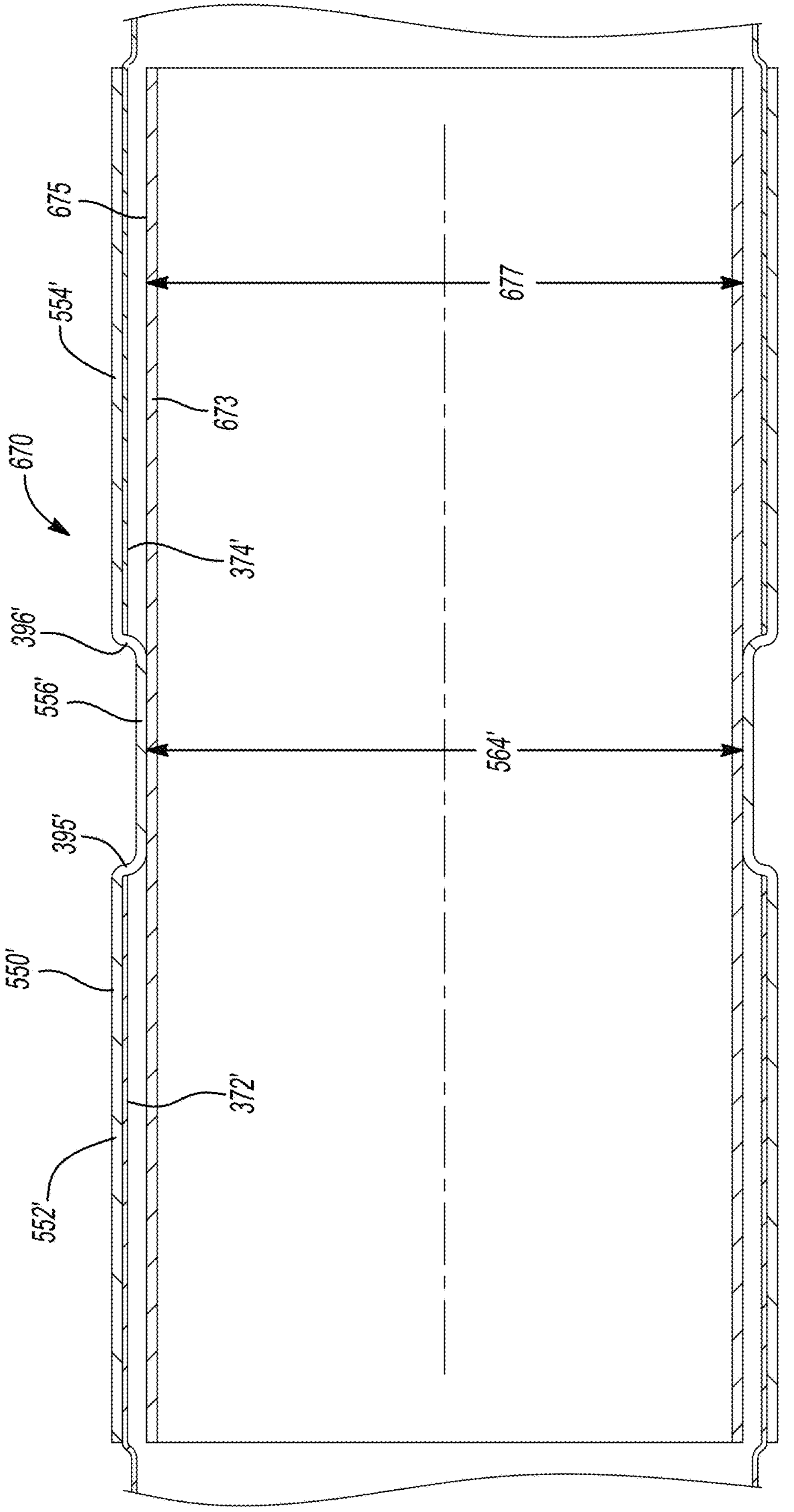
FIG. 33 is a cross-sectional view of a work-in-process step relating to interconnecting a first pipe, a second pipe, an outer sleeve, and an inner sleeve.
Figure 34:
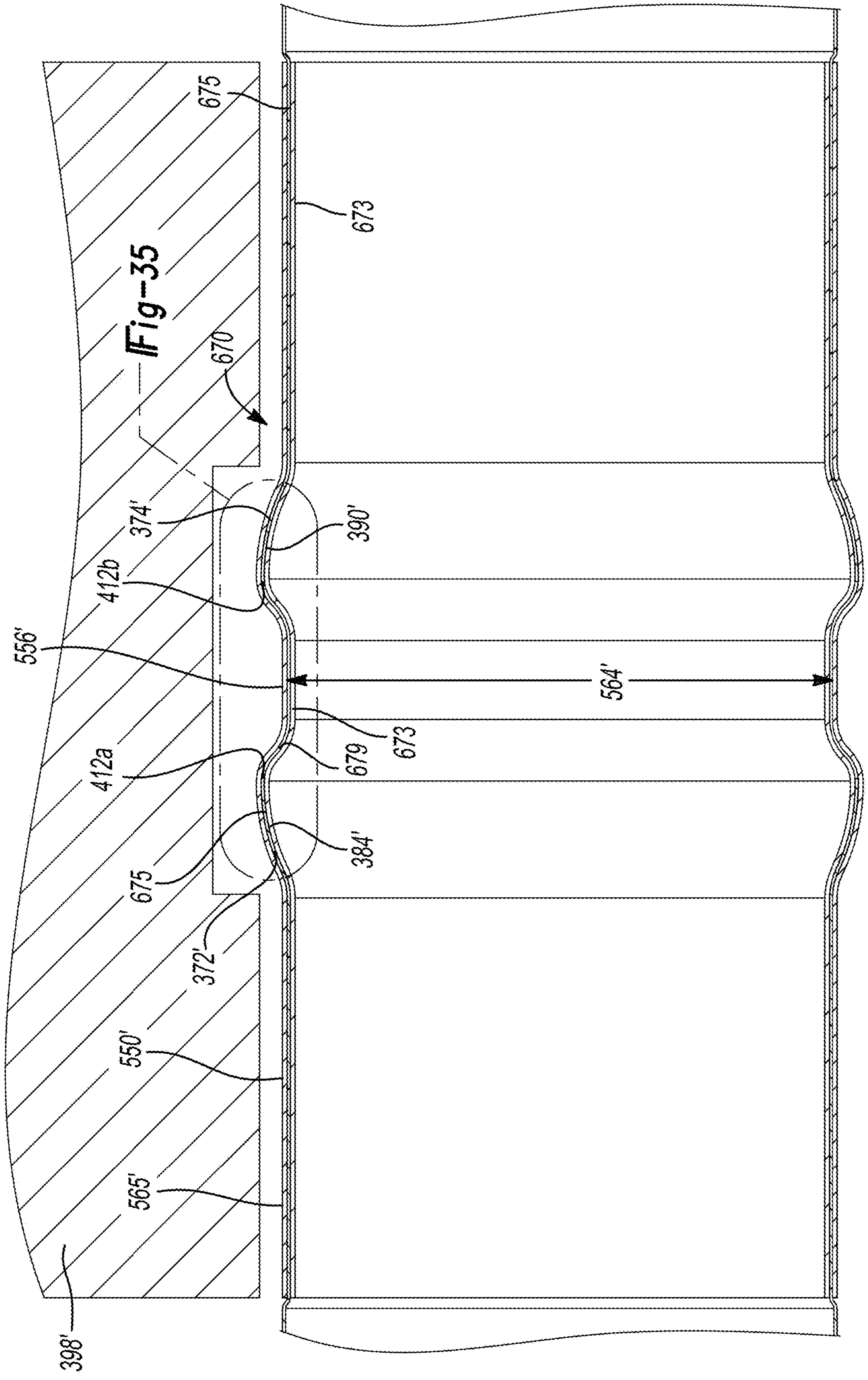
FIG. 34 is a cross-sectional view depicting deformed and interconnected first and second pipes with the outer sleeve and the inner sleeve according to another embodiment of the present disclosure.
Figure 35:
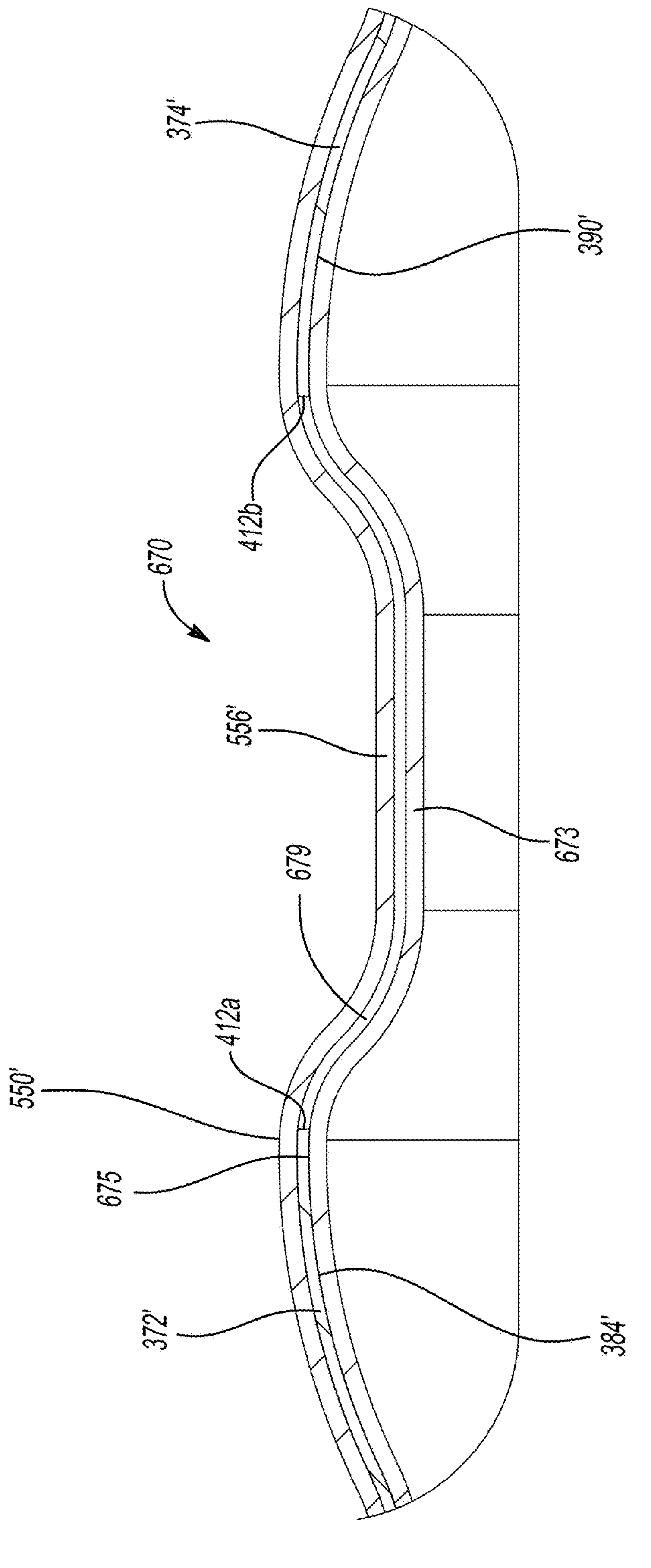
FIG. 35 is an enlarged fragmentary cross-sectional view of a portion of FIG. 34.
Figure 36:
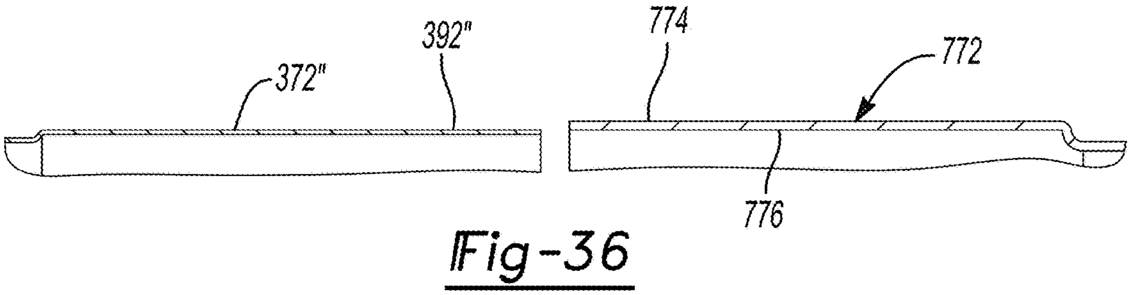
FIG. 36 is a cross-sectional view of a first pipe and an outer sleeve prior to mechanical interconnection.

An alternate embodiment joint 670 is depicted in FIGS. 33-35. Joint 670 is substantially similar to joint 370. As such, like elements will retain their previously introduced reference numerals including a prime suffix. Due to the substantial similarities in the joints, the first few steps of the process of forming joint 670 will not be shown in the figures repetitively. The process to construct joint 470 includes the steps previously described in relation to joint 370 as shown in FIGS. 28 and 29. FIG. 33 follows and is substantially similar to previously described FIG. 30 with the primary difference being introduction of an inner sleeve 673 being positioned within outer sleeve 550'. Inner sleeve 673 is constructed from the same material and exhibits the same cross-sectional wall thickness as outer sleeve 550'. Inner sleeve 673 extends the same overall axial extent as outer sleeve 550'. An outer surface 675 of inner sleeve 573 includes an outer diameter 677 that is slightly less than inner diameter 564' of central portion 556'.

The process of forming joint 670 continues by engaging a tool 398' with outer surface 565' of outer sleeve 550' as previously described in relation to forming joint 370. The joint forming process continues as previously described. As best shown in FIG. 35, inner sleeve 673 engages inner surface 384' of first pipe 372'. Outer surface 675 of inner sleeve 673 also engages inner surface 390' of second pipe 374' such that a three-layer reinforcement is provided by joint 670. Outer sleeve 550' and inner sleeve 673 sandwich first pipe 372' and second pipe 374' therebetween. A gap 679 may be provided between outer sleeve 550' and inner sleeve 673 in the central zone axially extending between terminal end portion 412*a* and terminal end portion 412*b*. Gap 679 may or may not extend this entire length.

Figure 37:
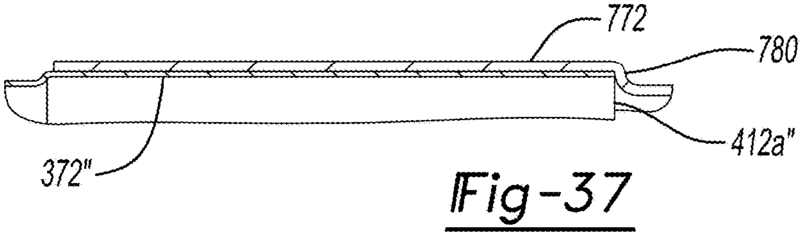
FIG. 37 is a cross-sectional view of a work-in-process step relating to interconnecting the first pipe and outer sleeve depicted in FIG. 36.

FIGS. 36-40 depict another alternate embodiment joint at reference numeral 770. Similar elements are identified with like reference numerals including a double prime suffix. Construction of joint 770 begins at FIG. 36 with radially enlarging a first pipe substantially the same as first pipe 372 and now identified as first pipe 372". An outer sleeve 772 includes an enlarged first end 774 including an inner surface 776 having an inner diameter slightly larger than outer diameter 392" and an opposite second end 778. As depicted in FIG. 37, first pipe 372' is inserted within outer sleeve 772 to create a first overlap. The extent of the axial overlap between the components is limited by a maximum insertion of first pipe 372" when terminal end portion 412*a*" reaches an inflection point 780.

Figure 38:
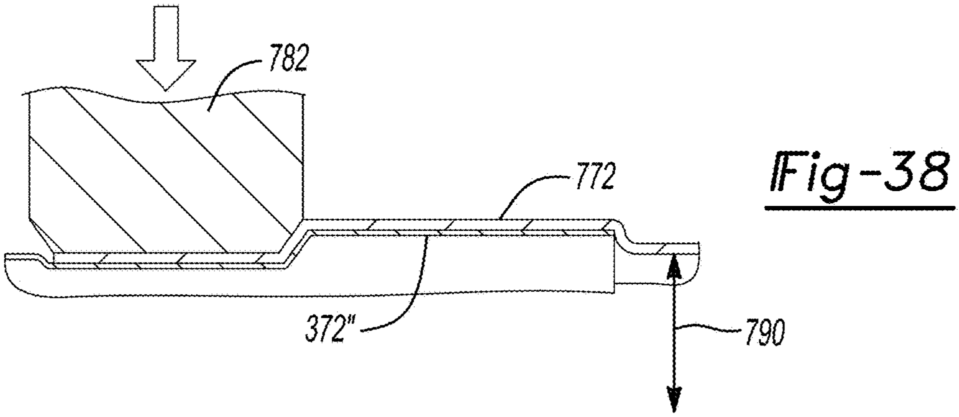
FIG. 38 is a cross-sectional view of a work-in-process step relating to interconnecting the first pipe and the outer sleeve depicted in FIG. 37.
Figure 39:
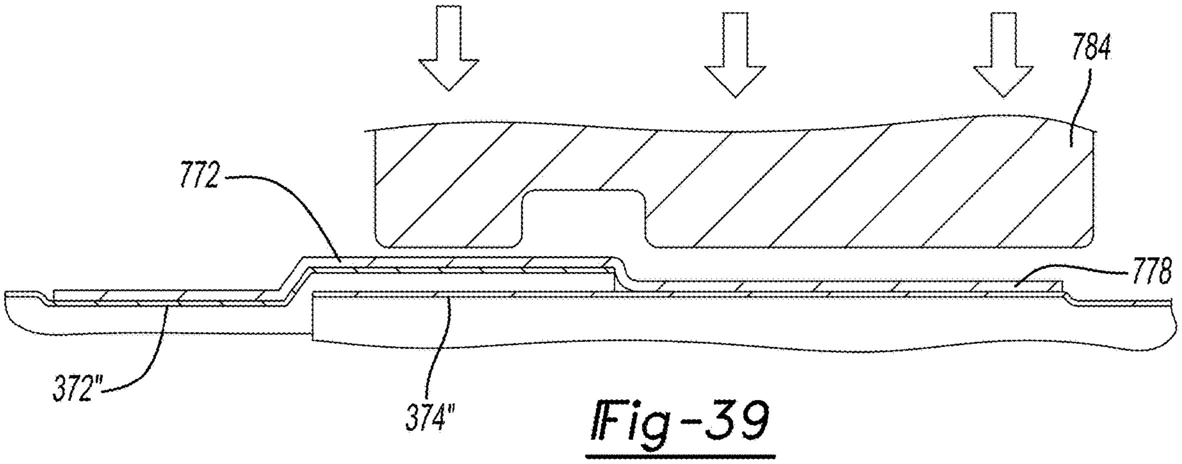
FIG. 39 is a cross-sectional view of a work-in-process step relating to interconnecting the first pipe, a second pipe, and the outer sleeve.

The method continues as depicted in FIG. 38. A first tool 782 radially inwardly deforms portions of outer sleeve 772 and first pipe 372" as previously listed at step 510 shown in FIG. 32. At a further process step depicted in FIG. 39, second pipe 374" is inserted within first pipe 372". Outer diameter 394" of second pipe 374" is sized slightly smaller than an inner diameter 790 of second end 778 of outer sleeve 772. A second tool 784 directly engages outer sleeve 772. Second tool 784 is radially inwardly driven to deform each of outer sleeve 772, first pipe 372" and second pipe 374" to define joint 770. In this embodiment, second tool 784 simultaneously performs step 514 and step 516 of FIG. 32. First tool 782 and second tool 784 are shaped to provide zones of contact substantially similar to Zone 1 and Zone 2 of other joints previously described.

Figure 40:
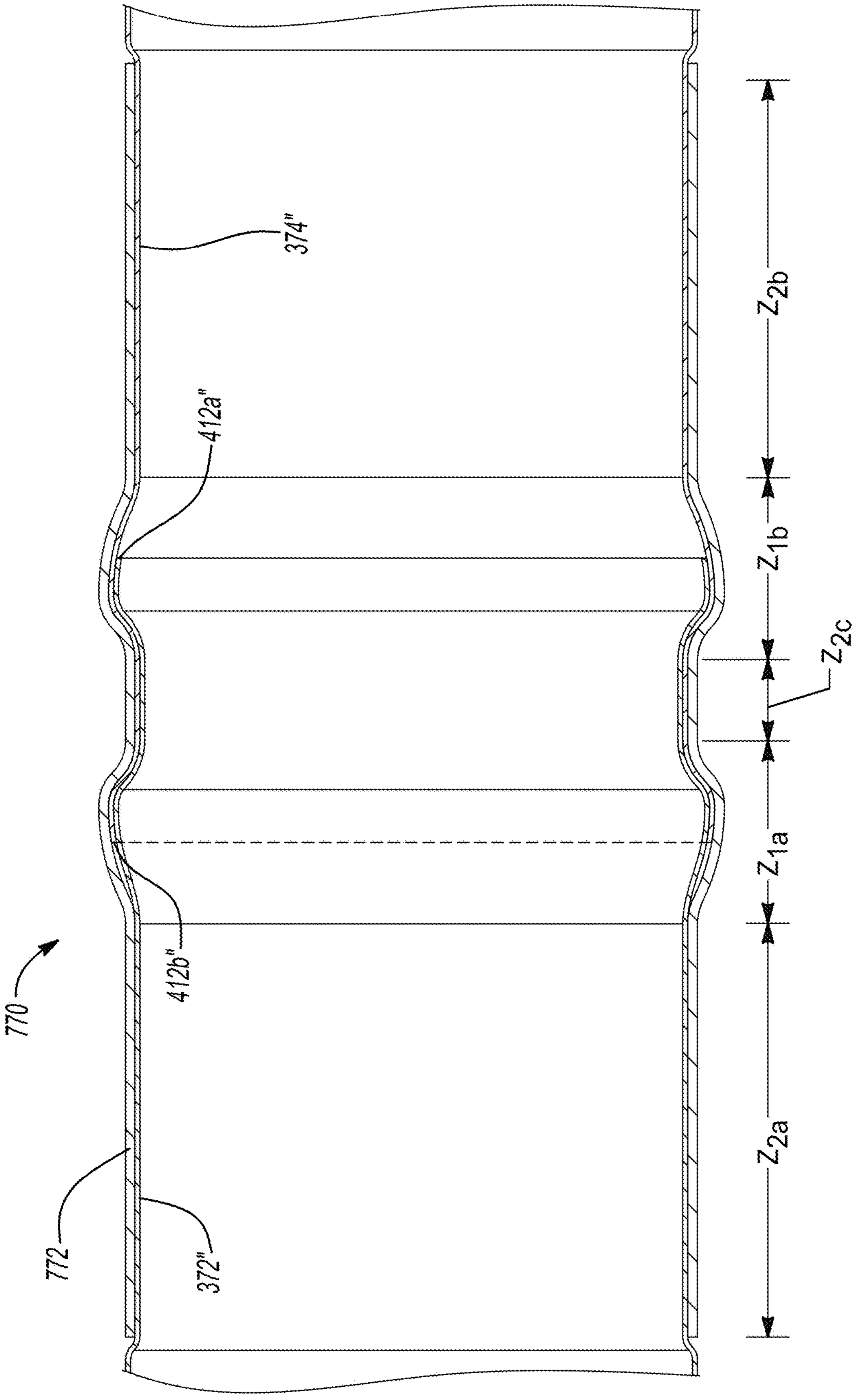
FIG. 40 is a cross-sectional view depicting deformed and interconnected first and second pipes with an outer sleeve according to another embodiment of the present disclosure.

As shown in FIG. 40, Zone 1a and Zone 1b have not been radially reduced by either first tool 782 or second tool 784. Zone 2a has been reduced in size by first tool 782 as shown in FIG. 38. Zone 2b has been reduced in size by second tool 784. A Zone 2c is created by second tool 784 as well. As such, resistance to relative axial and torsional movement between first pipe 372" and second pipe 374" is provided. First pipe 372" and second pipe 374" are sealing engaged with one another at Zone 2a, Zone 2b and Zone 2c. First pipe 372" includes a terminal end portion 412*a*" positioned in Zone 1b. Second pipe 374" includes a terminal end portion 412*b*" positioned within Zone 1a. Accordingly, a triple layer of pipes extends through a portion of Zone 1a, the entirety of Zone 2c, and a portion of Zone 1b.

At least some of the various configurations previously described may also be characterized as follows:

1. A method of joining components of an exhaust system, the method comprising:
   obtaining a first pipe with a first end;
   obtaining a second pipe with a second end;
   inserting the second end of the second pipe within the first end of the first pipe to provide a length of overlapped first and second pipes;
   circumscribing an outer surface of the first pipe at the length of overlapped first and second pipes with a tool including radially moveable jaws, wherein at least one of the jaws includes a radially inwardly extending projection protruding from a working surface of the at least one jaw;
   radially inwardly moving the jaws toward the outer surface until the projection contacts the outer surface before the working surface of the jaw contacts the outer surface;
   continuing to radially inwardly move the jaws to reduce an outer diameter of the first pipe and an outer diameter of the second pipe and deform the overlapped first and second pipes into pressed engagement with one another to define a pipe joint, wherein the projection is simultaneously driven into the outer surface of the first pipe to form a dimple mechanically locking the first pipe with the second pipe.
2. The method of claim 1, further including drivingly engaging the radially inwardly extending projection into the outer surface of the first pipe to form a recess shaped substantially the same as the shape of the projection prior to performing the continuing to radially inwardly move the jaws step.
3. The method of claim 2, further comprising axially elongating the recess to form the dimple while the continuing to radially inwardly move the jaws to reduce an outer diameter of the first pipe and an outer diameter of the second pipe and deform the overlapped first and second pipes into pressed engagement with one another step occurs, wherein the dimple has a shape that does not substantially correspond to the shape of the projection.
4. The method of claim 1, wherein the steps are performed without the presence of a tool positioned within either of the first and second pipes.
5. The method of claim 1, wherein the jaws are engaged with the outer surface an axial extent less than the length of overlapped first and second pipes.
6. The method of claim 1, wherein the projection has a hemispherical shape.
7. The method of claim 1, wherein the projection has an elongated shape extending in an axial direction of the first pipe.
8. The method of claim 2, wherein the projection is spaced apart from the outer surface of the first pipe when radial inward movement of the jaws is complete at the same as the working surface of the jaw remains in contact with the outer surface.
9. The method of claim 1, wherein the jaws include a plurality of additional projections circumferentially spaced apart from one another and axially aligned with the projection.
10. The method of claim 9, wherein the jaws include another set of projections circumferentially spaced apart from one another and axially offset from the plurality of additional projections.
11. The method of claim 1, wherein the first pipe and the second pipe are in sealing engagement having a leak rate less than 8 slpm.
12. An exhaust system comprising:
    a first pipe having a first end;
    a second pipe having a second end positioned within the first end to provide a length of overlapped first and second pipes, wherein both of the first end and the second end are radially inwardly deformed into pressed engagement with one another, the first and second pipes being sealingly engaged with one another at the radial deformation; and
    a dimple radially inwardly extending from an outer surface of the first pipe to mechanically lock the first pipe to the second pipe, the dimple being elongated in shape.
13. The exhaust system of claim 12, wherein the second pipe includes a pocket in receipt of the dimple.
14. The exhaust system of claim 12, further comprising a plurality of additional dimples circumferentially spaced apart from one another and axially aligned with the dimple.
15. The exhaust system of claim 14, further comprising another set of dimples circumferentially spaced apart from one another and axially offset from the plurality of additional dimples.

16. The exhaust system of claim 12, wherein the first pipe and the second pipe each have non-circular cross-sectional shapes at the length of overlapped first and second pipes.

1. A method of joining components of an exhaust system, the method comprising:

obtaining a first pipe with a first end;

obtaining a second pipe with a second end;

inserting the second end of the second pipe within the first end of the first pipe to provide a length of overlapped first and second pipes; and engaging a tool with a portion of an external surface the first pipe, wherein the length of overlapped first and second pipes is divided into a first zone that is not engaged by the tool, a second zone that is engaged by a projection radially inwardly extending from a working surface of the tool, and a third zone that is not engaged by the projection but is engaged by the working surface of the tool; and radially inwardly deforming the overlapped first and second pipes into pressed engagement with one another along the length of the third zone.

2. The method of claim 1, further comprising radially inwardly deforming the overlapped first and second pipes into pressed engagement with one another along the length of the second zone.

3. The method of claim 1, wherein the first zone begins at an edge of the length of overlapped first and second pipes, the edge being aligned with a distal end face of the second pipe.

4. The method of claim 1, wherein the external surface of the first pipe defines a larger diameter within the first zone than within the second or third zones.

5. The method of claim 1, wherein the second zone is axially positioned between the first and third zones.

6. The method of claim 1, wherein the third zone is axially positioned between the first and second zones.

7. The method of claim 1, wherein the first pipe and the second pipe are in sealing engagement within the third zone having a leak rate less than 8 slpm.

8. The method of claim 1, further including drivingly engaging the projection into the external surface of the first pipe to form a recess shaped substantially the same as the shape of the projection prior to performing the radially inwardly deforming step.

9. The method of claim 8, further comprising axially elongating the recess to form a dimple mechanically interlocking the first and second pipes.

10. An exhaust system comprising:

a first pipe having a first end; and a second pipe having a second end positioned within the first end to provide a length of overlapped first and second pipes, wherein the length of overlapped first and second pipes is divided into a first zone wherein an outer surface of the first pipe is tapered, a second zone including a radially inwardly extending dimple, and a third zone wherein the outer surface of the first pipe defines a diameter less than a diametral size of the tapered surface and does not include a dimple, wherein the first end and the second end are radially inwardly deformed into pressed engagement with one another, the first and second pipes being sealingly engaged with one another at the third zone.

11. The exhaust system of claim 10, wherein the first zone begins at an edge of the length of overlapped first and second pipes, the edge being aligned with a distal end face of the second pipe.

12. The exhaust system of claim 10, wherein the outer surface of the first pipe defines a larger diameter within the first zone than within the second or third zones.

13. The exhaust system of claim 10, wherein the second zone is axially positioned between the first and third zones.

14. The exhaust system of claim 10, wherein the third zone is axially positioned between the first and second zones.

15. The exhaust system of claim 10, wherein the first pipe and the second pipe are in sealing engagement within the third zone having a leak rate less than 8 slpm.

1. A method of joining components of an exhaust system, the method comprising: obtaining a first pipe with a first end;

obtaining a second pipe with a second end;

inserting the second end of the second pipe within the first end of the first pipe to provide a length of overlapped first and second pipes; and radially inwardly deforming the overlapped first and second pipes into pressed engagement with one another along the length of overlapped first and second pipes to define a pipe joint.

2. The method of claim 1, wherein the length of overlapped first and second pipes is greater than a length in which the first and second pipes are radially inwardly deformed.

3. The method of claim 1, wherein a portion of the overlapped first and second pipes is not engaged by a tool used to radially inwardly deform the overlapped first and second pipes.

4. The method of claim 3, wherein the portion of the overlapped first and second pipes that is not engaged by a tool is positioned at a terminal end of the second pipe.

5. The method of claim 1, wherein the first end of the first pipe is radially enlarged, the first pipe including a body portion having a diameter less than the radially enlarged first end, wherein the radially inwardly deforming reduces the radially enlarged first end to a size equal to or less than diameter of the body portion.

6. The method of claim 1, wherein the radially inwardly deforming includes engaging a tool on an outer surface of the first pipe and not engaging a tool on an inner surface of the second pipe.

7. The method of claim 1, further including engaging a tool with a radially inwardly extending projection with an outer surface of the first pipe to form a localized recess.

8. The method of claim 7, further comprising simultaneously radially inwardly moving the projection radially inwardly while the deforming the overlapped first and second pipes into pressed engagement with one another occurs, wherein the simultaneous projection moving and radially inward deforming steps form a dimple mechanically locking the first pipe with the second pipe.

9. The method of claim 8, wherein the engaging a tool with a radially inwardly extending projection with an outer surface of the first pipe locally deforms the second pipe.

10. The method of claim 7, wherein the projection contacts a portion of the overlapped first and second pipes that is not radially reduced about its entire periphery.

11. The method of claim 7, wherein the recess is formed along the radially inwardly deformed portion of the overlapped first and second pipes.

12. The method of claim 1, wherein the radially inwardly deforming the overlapped first and second pipes into pressed engagement step positions the first pipe and the second pipe in sealing engagement with one another.

13. The method of claim 12, wherein the sealing engagement defines a joint having a leak rate less than 8 slpm.

14. An exhaust system comprising:

a first pipe having a first end; and a second pipe having a second end positioned within the first end to provide a length of overlapped first and second pipes, wherein both of the first end and the second end are radially inwardly deformed into pressed engagement with one another, the first and second pipes being sealingly engaged with one another at the length of overlapped pipes.

15. The exhaust system of claim 14, wherein an outer diameter of the first pipe and an outer diameter of the second pipe are equal except at the first and second ends.

16. The exhaust system of claim 14, wherein the second pipe is in a slip fit interconnection with the first end of the first pipe prior to deformation.

17. The exhaust system of claim 14, wherein the length of overlap ranges from one to four inches.

18. The exhaust system of claim 14, wherein the length of overlapped first and second pipes is greater than a length of the first and second pipes radially inwardly deformed.

19. The exhaust system of claim 14, further comprising a dimple radially inwardly extending from an outer surface of the first pipe to mechanically lock the first pipe to the second pipe.

20. The exhaust system of claim 19, wherein the first and second pipes are sealingly engaged with one another at the interface between the first and second pipes along an area that circumscribes the dimple.

21. The exhaust system of claim 19, wherein the dimple is positioned with the length of overlapped first and second pipes that has not been radially inwardly deformed.

22. The exhaust system of claim 19, wherein the dimple is positioned with the length of overlapped first and second pipes that has been radially inwardly deformed.

23. The exhaust system of claim 19, wherein the dimple overlaps the length of overlapped first and second pipes that has not been radially inwardly deformed and the of overlapped first and second pipes that has been radially inwardly deformed.

What is claimed is:

1. A method of joining components of an exhaust system, the method comprising:

obtaining a longitudinally extending outer sleeve;

obtaining a first pipe with a first end;

obtaining a second pipe with a second end;

inserting the first end of the first pipe within the outer sleeve to define a first overlap;

inserting the second end of the second pipe within the outer sleeve to define a second overlap;

radially inwardly deforming the outer sleeve and the first pipe at the first overlap; and radially inwardly deforming the outer sleeve and the second pipe at the second overlap, the outer sleeve and the first pipe as well as the outer sleeve and the second pipe being pressed into engagement with one another along a length of first overlap and the second overlap to define a pipe joint, further including concurrently engaging a tool with a radially inwardly extending projection with an outer surface of the outer sleeve to form a dimple in the outer sleeve and a corresponding pocket in the first pipe or the second pipe while at least one of the radially inwardly deforming steps is performed, wherein during the engaging a tool with a radially inwardly extending projection with an outer surface of the outer sleeve, material around a perimeter of the dimple is constrained to define a longitudinally elongated dimple shape as compared to a shape of the projection.

2. The method of claim 1, wherein a portion of the first overlap is not engaged by a tool used to radially inwardly deform the outer sleeve at the first overlap.

3. The method of claim 2, wherein the portion of the first overlap that is not engaged by a tool is positioned at a terminal end of the first pipe.

4. The method of claim 1, wherein the first end of the first pipe is radially enlarged, the first pipe including a body portion having a diameter less than the radially enlarged first end, wherein the radially inwardly deforming reduces the radially enlarged first end to a size equal to or less than the diameter of the body portion.

5. The method of claim 1, wherein the radially inwardly deforming the outer sleeve and the first pipe includes engaging a tool on an outer surface of the outer sleeve and not engaging a tool on an inner surface of the first pipe.

6. The method of claim 1, further comprising positioning an inner sleeve within the outer sleeve, the first pipe, and the second pipe prior to the radially inwardly deforming steps, the method further including pressing the first pipe and the second pipe into engagement with the inner sleeve during the radially inwardly deforming steps.

7. The method of claim 1, wherein the radially inwardly deforming the outer sleeve and the first pipe at the first overlap into pressed engagement step positions the first pipe and the outer sleeve in sealing engagement with one another.

8. The method of claim 1, further comprising overlapping a portion of the second pipe with a portion of the first pipe to define a third overlap prior to radially inwardly deforming the outer sleeve and the second pipe at the second overlap.

9. The method of claim 8, further comprising radially inwardly deforming the outer sleeve, the first pipe, and the second pipe at the third overlap.

10. The method of claim 1, wherein the outer sleeve includes a wall thickness 1.2 to 3.0 times a thickness of the first pipe wall.

* * * * *